United States Patent
Huang et al.

(10) Patent No.: US 11,075,999 B2
(45) Date of Patent: Jul. 27, 2021

(54) ACCESSING RESOURCES IN A REMOTE ACCESS OR CLOUD-BASED NETWORK ENVIRONMENT

(71) Applicant: Citrix Systems, Inc., Fort Lauderdale, FL (US)

(72) Inventors: Feng Huang, Girton (GB); Ross Large, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 192 days.

(21) Appl. No.: 16/114,764

(22) Filed: Aug. 28, 2018

(65) Prior Publication Data
US 2020/0076902 A1   Mar. 5, 2020

(51) Int. Cl.
G06F 15/16 (2006.01)
H04L 29/08 (2006.01)
H04L 12/66 (2006.01)

(52) U.S. Cl.
CPC .......... H04L 67/141 (2013.01); H04L 12/66 (2013.01); H04L 67/10 (2013.01)

(58) Field of Classification Search
CPC ........ H04L 67/141; H04L 12/66; H04L 67/10
USPC ................................................ 709/227, 223
See application file for complete search history.

(56) References Cited

U.S. PATENT DOCUMENTS

2008/0034110 A1 * 2/2008 Suganthi ............ H04L 63/0272
                                                      709/238
2015/0117623 A1   4/2015 Fandrianto et al.

FOREIGN PATENT DOCUMENTS

EP        2466950 A1       6/2012
WO     2015/109950 A1      7/2015
WO   WO-2015109950 A1 *    7/2015  ........... G06F 9/5072

OTHER PUBLICATIONS

Carl Stalhood, "StoreFront Config for NetScaler Gateway," 65 pages, retrieved (Wayback Machine) Jan. 9, 2018 from https://web.archive.org/web/20180109004249/http:/www.carlstalhood.com/storefront-config-for-netscaler-gateway/.
Nov. 25, 2019—(WO) International Search Report and Written Opinion—App PCT/US2019/048230.

* cited by examiner

*Primary Examiner* — Dustin Nguyen
*Assistant Examiner* — Joel Mesa
(74) *Attorney, Agent, or Firm* — Banner & Witcoff, Ltd.

(57) ABSTRACT

A client device may, as part of a remote access or cloud-based network environment, access a resource either by using a connection to a gateway or by using a connection that bypasses the gateway. Which connection is used may be based on the network location of the resources provided by the network environment and network location of the client device. For example, if the client device and a resource are located at the same network location or connected to the same local network, the client device may access the resource by using a connection that bypasses the gateway. If the client device and the resource are located at different network locations or are connected to different local networks, the client device may connect to the gateway to access the resource.

20 Claims, 19 Drawing Sheets

ACCESSING RESOURCES IN A REMOTE ACCESS OR CLOUD-BASED NETWORK ENVIRONMENT

FIELD

Aspects described herein generally relate to connecting to and accessing resources in a remote access or cloud-based network environment. Additional aspects described herein relate to a client device, based on certain conditions of the network environment, accessing a resource using a connection to a gateway device or a connection that bypasses the gateway.

BACKGROUND

The remote access environments and cloud-based environments may provide devices with access to connected resources. The resources, for example, may be used to launch and execute an application (e.g., a desktop) that can be used by a device as if the device itself was executing the application. Some remote access and cloud-based network environments include a gateway. In some network environments, to access a resource, a device may first connect to the gateway. The gateway may then communicate with the resource on behalf of the device. Introduction of the gateway may introduce latency to communications associated with the device and the resource. Thus, the overall performance of the network is lessened by the introduction of the gateway.

Additionally, the gateway may be part of a computing platform that provides a cloud service to a client device, and the computing platform may, as part of the cloud service, assign the resource to execute an application. The end device, resource and the computing platform may communicate with each other via a wide area network and/or may be physically located at different locations. Undesirable latency may be introduced into the system as a result of the client device, the gateway and the resource communicating via a wide area network or being located at different locations. Additionally, the gateway, by acting as an intermediary between the client device and the resource, may introduce an additional, and undesirable, point of failure into the system.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present disclosure, aspects described herein relate to methods, devices and systems that allow for a client device, as part of a remote access or cloud-based network environment, to access a resource either by using a connection to a gateway or by using a connection that bypasses the gateway. Which connection is used may be based on the network location of the resources and the network location of the client device. For example, if the client device and a resource are located at the same network location or connected to the same local network, the client device may access the resource by using a connection that bypasses the gateway. If the client device and the resource are located at different network locations or are connected to different local networks, the client device may connect to the gateway to access the resource. Additionally, because resources in remote access or cloud-based network environments may be organized or otherwise associated with one or more resource groups, the ability to bypass a gateway may be based on which resource groups a client device is able to communicate with if a gateway is bypassed.

Additionally, using a connection that bypasses the gateway may be prioritized over use of a connection to a gateway. In view of the ability to bypass a gateway if the resource and a client device are located at the same network location or connected to the same local network, resource selection may be performed based on resources and client devices being located at the same network location or connected to the same local network. For example, a resource may be selected to launch and execute an application if the resource is located at the same network location as a client device or is connected to the same local network as the client device.

As some examples, a computing device at a first network location may transmit one or more first requests for resource group identification. The computing device may receive, from a first resource associated with a first resource group, a first resource group identification. The first resource may be at the first network location. The computing device may determine, based on the first resource group identification, a first indication that the computing device is able to communicate with the first resource group if a gateway is bypassed. The gateway may be at a second network location. The computing device may transmit, to a computing platform associated with the gateway, a request to launch a first application. The computing platform may be at the second network location. The request to launch the first application may include the first indication that the computing device is able to communicate with the first resource group if the gateway is bypassed. The computing device may receive, from the computing platform, first configuration data for a first application session that, based on a connection to the resource, bypasses the gateway. The computing device may connect, based on the first configuration data, to the first resource. The computing device may perform, the first application session using the connection to the resource These and additional aspects will be appreciated based on discussion of the present disclosure.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
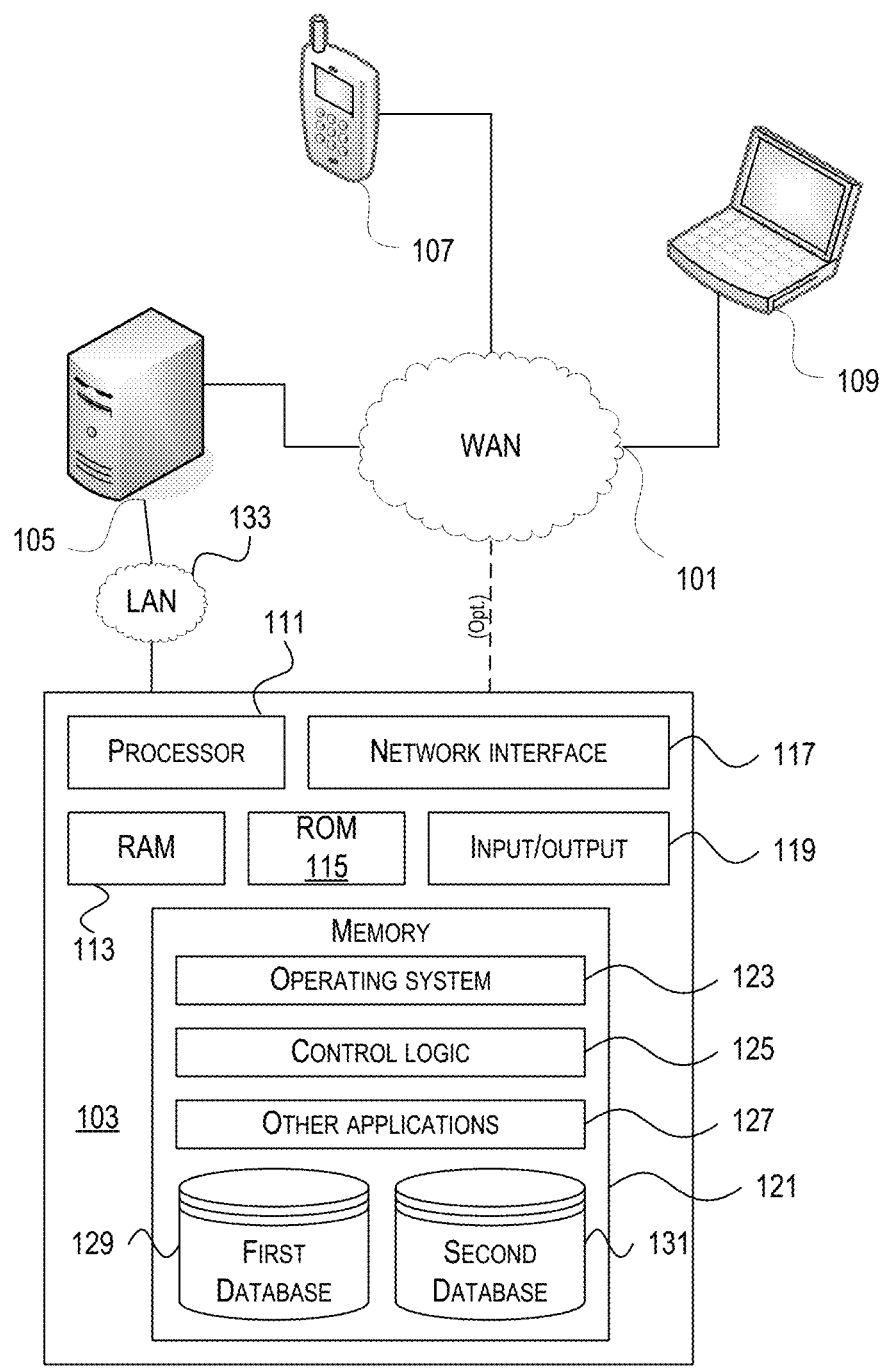
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein relate to connecting to and accessing resources in a remote access or cloud-based network environment. Additional aspects described herein relate to a client device, based on certain conditions of the network environment, accessing a resource using a connection to a gateway device or a connection that bypasses the gateway.

More particularly, a client device may, as part of a remote access or cloud-based network environment, access a resource either by using a connection to a gateway or by using a connection that bypasses the gateway. Which connection is used may be based on the network location of the resources registered for the services provided by the network environment and the network location of the client device. For example, if the client device and a resource are located at the same network location or connected to the same local network, the client device may access the resource by using a connection that bypasses the gateway. If the client device and the resource are located at different network locations or are connected to different local networks, the client device may connect to the gateway to access the resource. By bypassing the gateway, the latency of communications between the client device and the resource may be reduced and the points of failure in the system may be reduced. If the client device and the resource are connected to different networks (e.g., the client device is connected to a user's home network and the resource is connected to an intranet of the enterprise), the client device may access the resource using a connection to the gateway. Additionally, because resources in remote access or cloud-based network environments may be organized or otherwise associated with one or more resource groups, the ability to bypass a gateway may be based on which resource groups a client device is able to communicate with if a gateway is bypassed.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote access (e.g., allowing devices to access a desktop or other application remotely), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
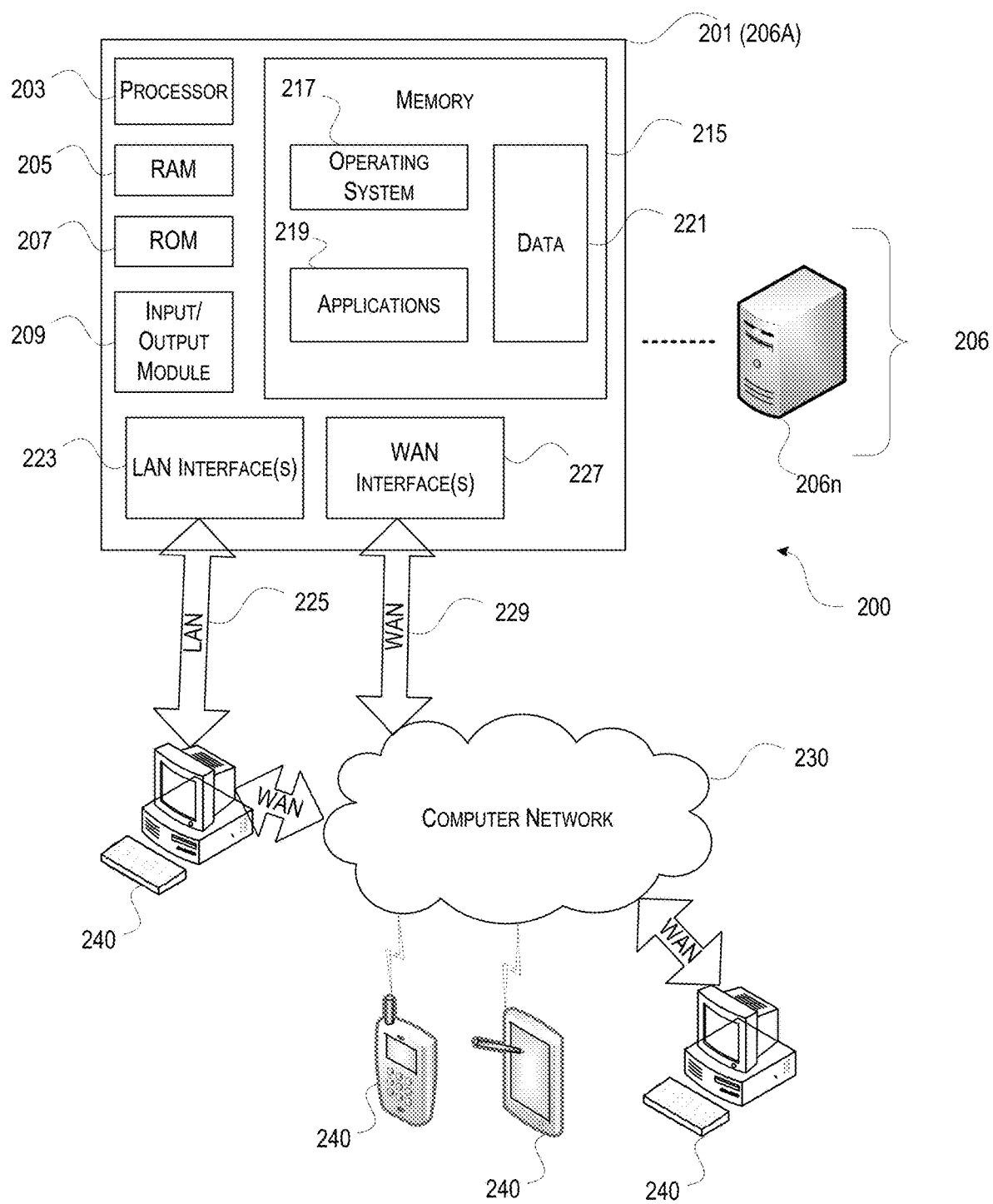
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server 206a and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
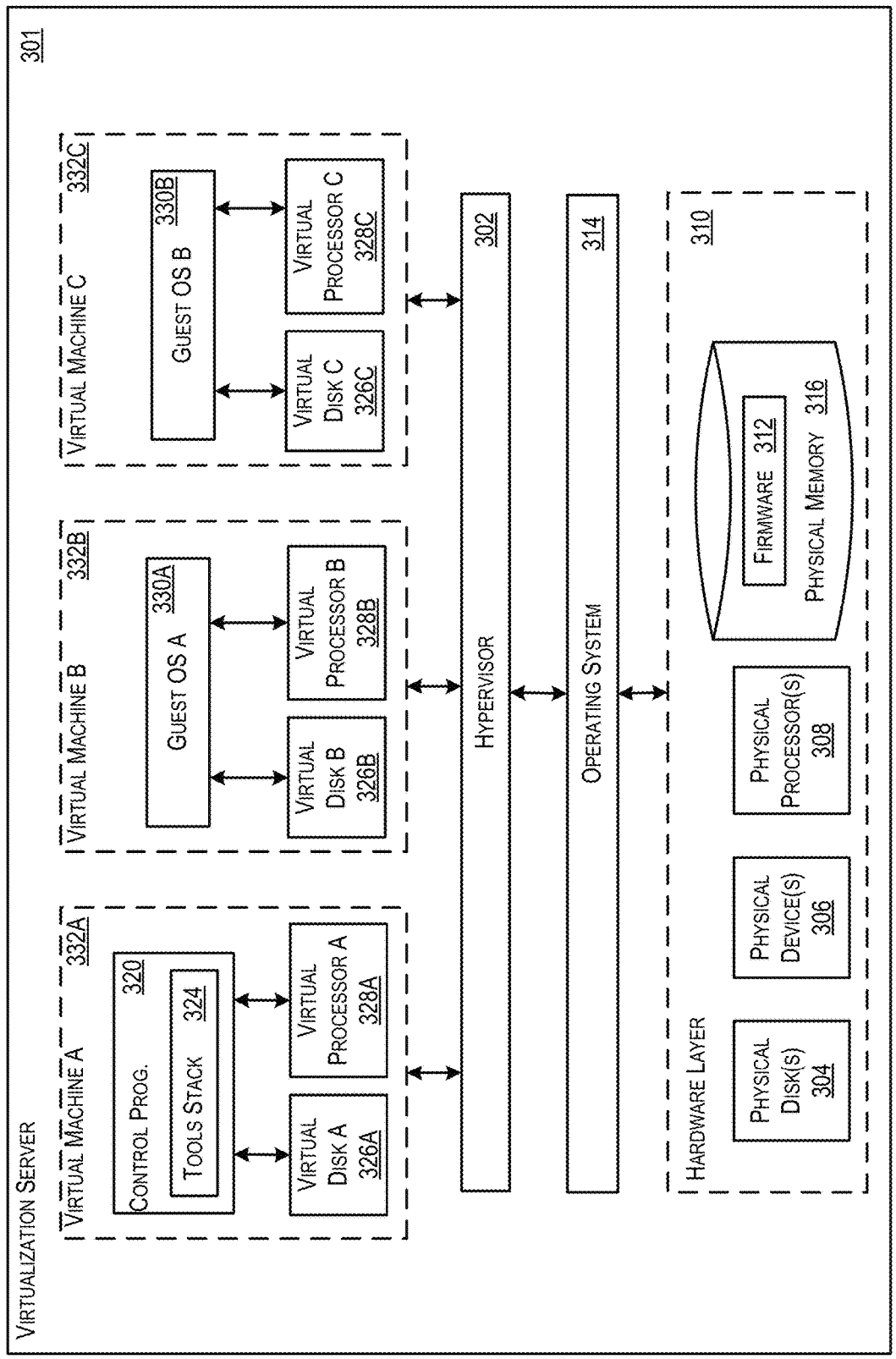
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
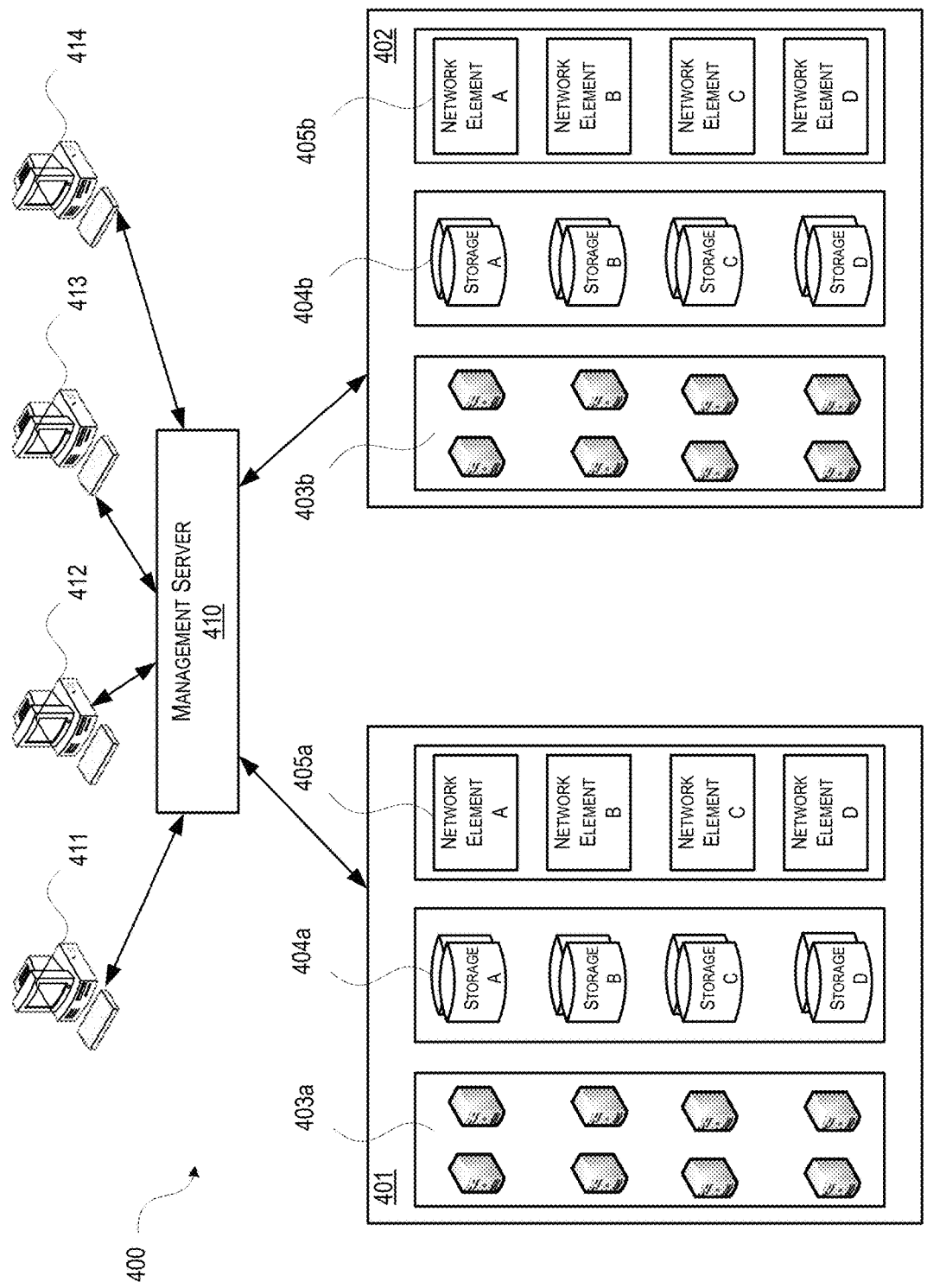
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
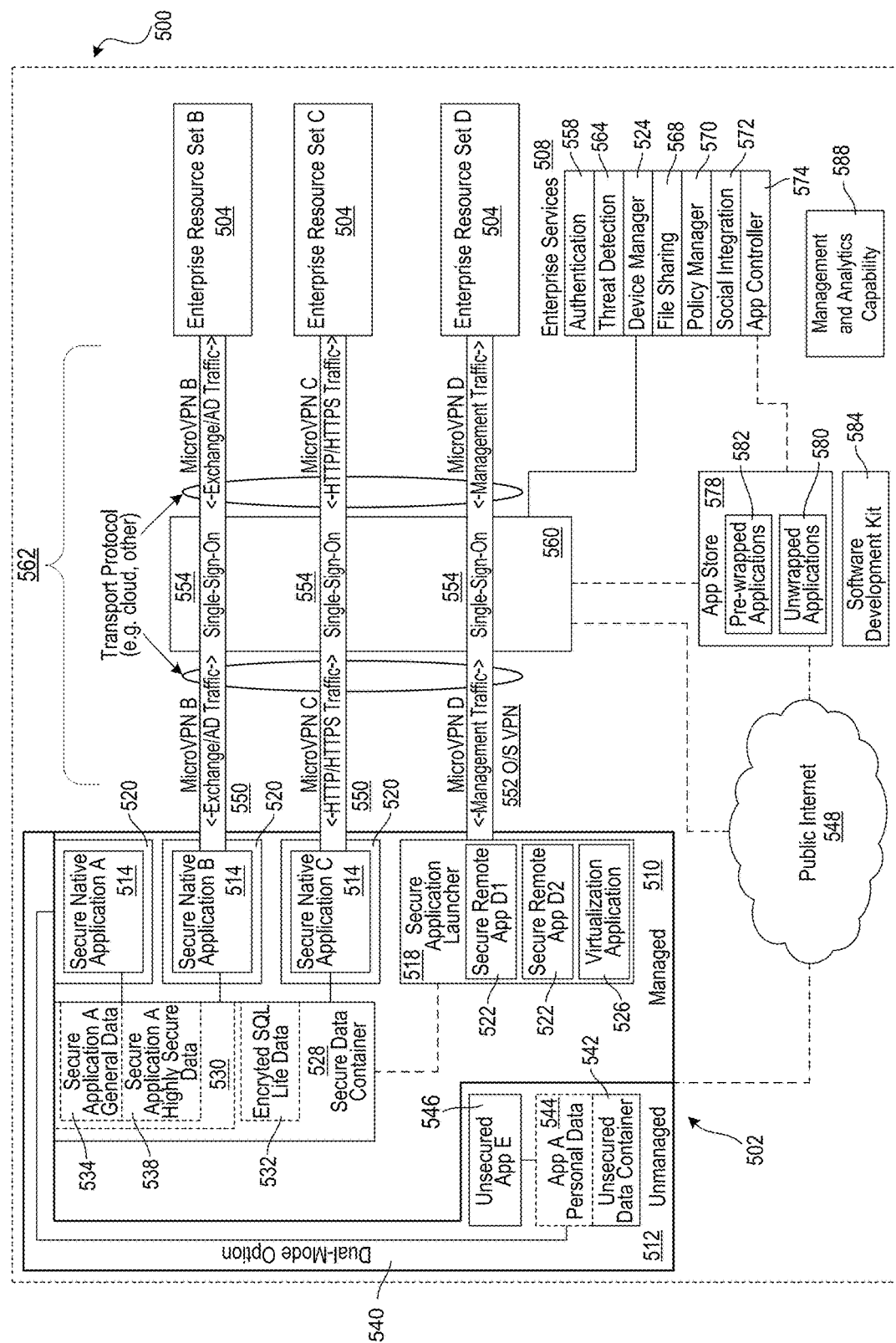
FIG. 5 depicts an illustrative enterprise mobility management system that may be used in accordance with one or more illustrative aspects described herein.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container 528 may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway 560 via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
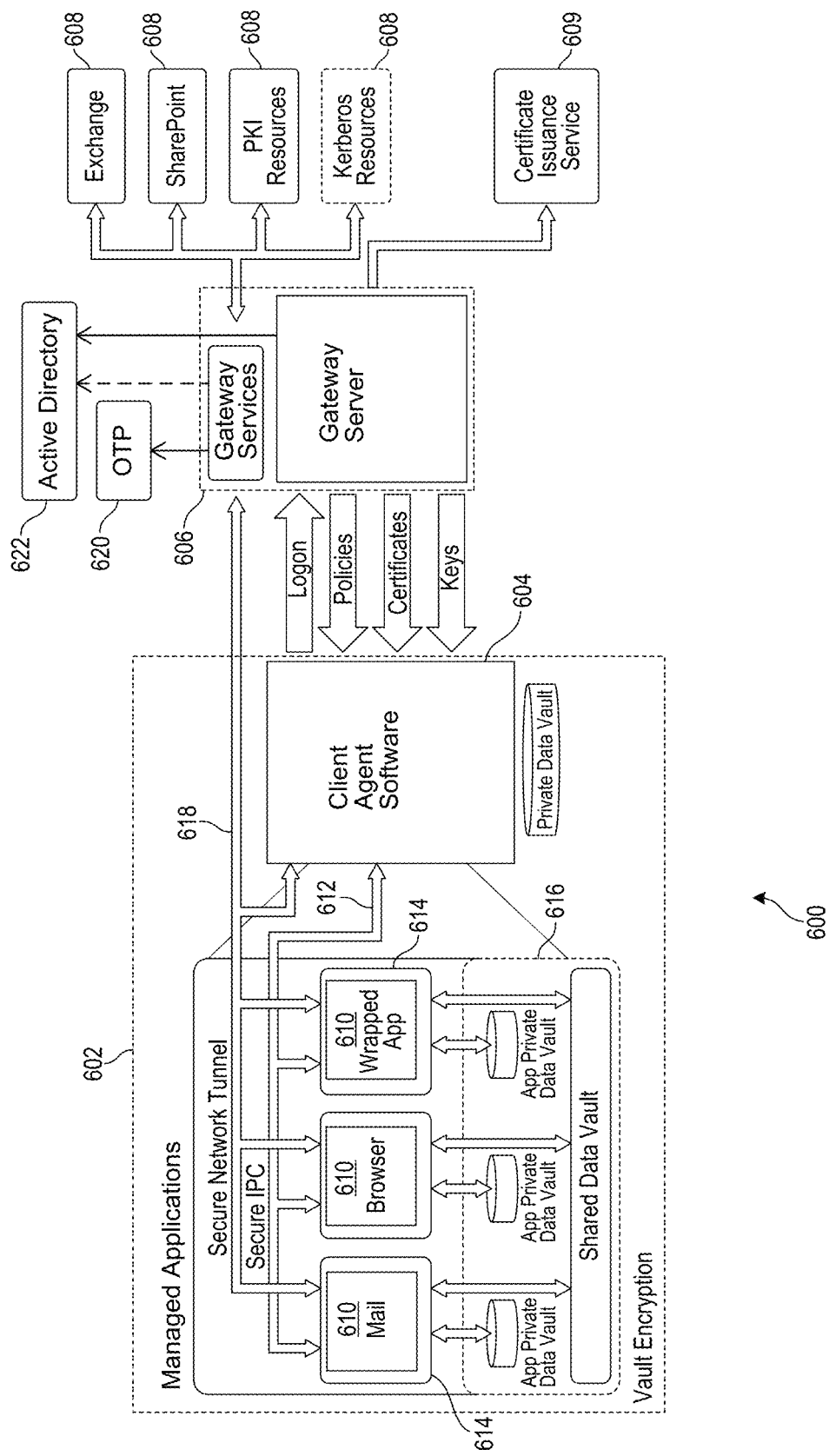
FIG. 6 depicts another illustrative enterprise mobility management system that may be used in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PM protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PM protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Figure 7:
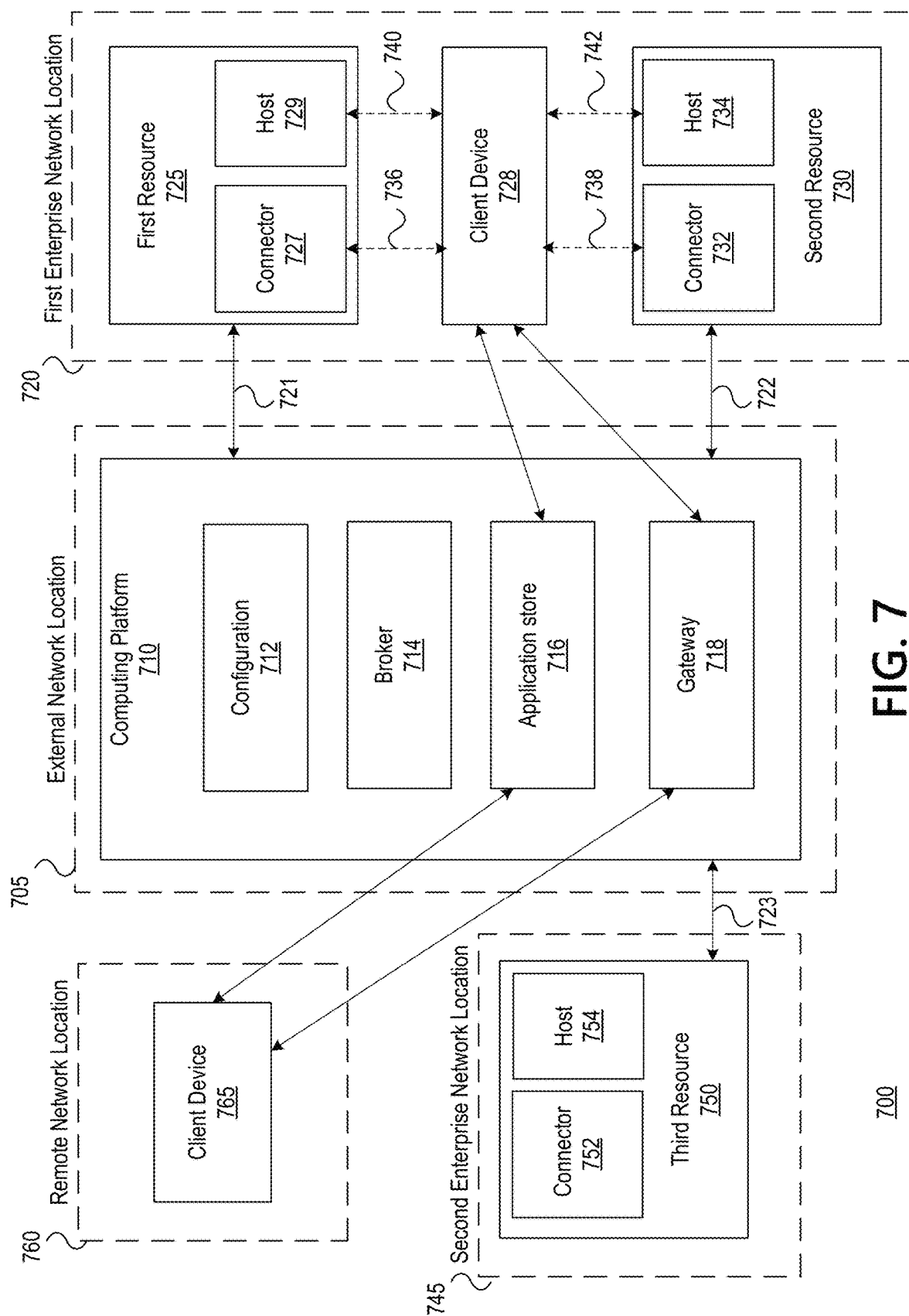
FIG. 7 depicts an example block diagram for connecting to resources in a remote-access or cloud-based network environment that may be used in accordance with one or more aspects described herein.

Accessing a Resource Using a Connection to a Gateway or a Connection That Bypasses the Gateway As mentioned above, aspects described herein relate to connecting to and accessing resources in a remote access or cloud-based network environment. Additional aspects described herein relate to a client device, based on certain conditions of the network environment, accessing a resource using a connection to a gateway device or a connection that bypasses the gateway. In connection with these aspects, and others, FIG. 7 depicts an example block diagram for connecting to resources in a remote access or cloud-based network environment. For simplicity, the examples discussed throughout this disclosure will refer to the services provided by the remote access or cloud-based network environment as being a cloud-based service. The examples could also be used for a remote access service. For many examples, cloud-based services and remote access services may be used interchangeably.

In FIG. 7, a simplified example network environment 700 is illustrated. The example network environment 700 may enable the provision and usage of one or more cloud-based services, or other type of remote access service, by one or more client devices. The example network environment 700 includes computing devices and computing platforms at various different network locations. As depicted, the example network environment includes four example network locations: an external network location 705, a first enterprise network location 720, a second enterprise network location 745, and a remote network location 760. Each of the four network locations may communicate with each other via a wide area network (e.g., the internal and/or may be located at geographically different locations. As an example, the external network location 705 may be a facility of a provider that manages or otherwise controls cloud-based services and may be located at Arlington, Va.; the first enterprise network location 720 may be a first facility of an enterprise that uses the cloud-based services and may be located at Boston, Mass.; the second enterprise network location 745 may be a second facility of the enterprise and may be located at Philadelphia, Pa.; and the remote network location 760 may be a premises of an employee of the enterprise and may be located at Worcester, Mass.

One or more of the cloud-based services provided by the network environment 700 may be the access to the resources of the enterprise network locations (e.g., first resource 725, second resource 730, and third resource 750). The resources may launch and execute various applications for use by a client device. A client device's usage of an application being executed by a resource may be referred to as an application session. One example of an application that can be launched and used is a remote desktop application. Other examples of the types of an application that can be launched and used are provided throughout this disclosure including, for example, enterprise resources 504 of FIG. 5 and enterprise resources 608 of FIG. 6. Indeed, the resources 725, 730 and 750 may represent different enterprise resources described in connection with FIGS. 1-6.

Additionally, each of the resources 725, 730 and 750 may include components that are separately addressable. For example, each of the resources 725, 730 and 750 includes a connecter (727, 732 and 752, respectively) and a host (729, 734 and 754, respectively). Each of the connectors and hosts may have its own network address and may be able to send and receive communications to other components of the network environment including, example, the gateway 718, the broker 714, configuration 712 and the client device 728. Each of the connectors may be configured to register its respective resource with the configuration 712 and to communicate with the broker 714 to prepare for a launch of an application. Additionally, each of the connectors may be configured to respond to requests for identification that are received from a client device (e.g., client device 728 or client device 765). Connectors are sometimes referred to as edge servers.

Each of the hosts may be configured to enable connections to applications being executed by the resource. Each of the hosts may communicate with the connector of its resource in connection with preparing a launch of an application. Further, each of the hosts may be configured to communicate, either with the gateway 718 or with a client device (e.g., device 728), as part of an application session being performed by a client device. A host may be configured to provide the application data from the resource for an application session. As one example, if resource 725 is executing a desktop application for client device 765, host 729 may transmit, to the gateway 718, data indicating an update to a user interface of the desktop application. Upon receipt, the gateway 718 may forward the data to the client device 765. The client device 765 may, based on the data, regenerate a display to incorporate the updates to the user interface. One example of a host may be a virtual delivery agent (VDA), such as an HDX Server developed by Citrix Systems.

Additionally, each resource 725, 730 and 750 may be organized into or otherwise associated with a resource group. Each resource group may be assigned to its own network address (e.g., an Internet Protocol (IP) address or a multicast address) and its own identifier (e.g., an alphanumeric string or some other code that is unique among the resource groups). A resource group may be organized as a collection of one or more resources that are located at the same network location. A resource, however, could be organized into its own resource group even if other resources are located at the same network location. For example, each of the resources 725, 730 and 750 may be associated with its own resource group. Indeed, for simplicity of the discussion and examples of this disclosure, the examples discussed throughout this disclosure will be discussed in terms of each resource 725, 730 and 750 being organized or otherwise associated with its own resource group (e.g., first resource 725 is associated with a first resource group; second resource 730 is associated with a second resource group; and third resource 750 is associated with a third resource group). A service for the resource group may be configured as part of a connector or as a stand-alone entity separate from the connectors/hosts of the resource. For simplicity of the discussion and examples of this disclosure, the service for a resource group is configured as part of a connector.

As an alternative example of the ways in which resource groups could be organized, resources 725 and 730 could be associated with a first network location and resource 750 could be associated with a second resource group. As another alternative example of the ways in which resource groups could be organized, a resource group may be organized to include two resources (e.g., resources 725 and 730), but may only include a single connector. In other words, instead of connectors 727 and 732 being configured for resources 725 and 730, only one of those two connectors may be configured for the resource group.

The computing platform 710 of the external network location 705 may manage and/or control access to the resources 725, 730 and 750. As represented via connections 721, 722 and 723, the computing platform 710 may be able to communicate with each of the resources 725, 730 and 750. The communications between the computing platform 710 and the resources 725, 730 and 750 may be routed via a wide area network. Services for managing and/or controlling access to the resources (e.g., resources 725, 730 and 750) may include a configuration 712, a broker 714, an application store 716, and a gateway 718. The computing platform 710 and/or the services of the computing platform 710 may represent different portions of the system architectures described in connection with FIGS. 1-6. For example, the application store 716 may be the application store 578 of FIG. 5; the gateway 718 may be the gateway 560 of FIG. 5; the computing platform 710 may be the gateway 606 of FIG. 6; or the services of the computing platform 710 may be part of the enterprise services 508 of FIG. 5.

As a brief overview of the services 712-718, the configuration 712 may be configured to register the resources 725, 730 and 750 for a cloud-based service and maintain the information of which resources are currently active or otherwise registered as part of a cloud-based service. The broker 714 may be configured to select a resource to launch and execute an application for use by a client device. The application store 716 may be configured to provide data associated with the cloud-based services to a client device including, for example, configuration data for an application session. The gateway 718 may be configured to forward data associated with the application session between a client device and a resource.

The example network environment 700 includes two example client devices that may use the cloud-based services. As depicted, client device 728 is located at the first enterprise location 720, and the client device 765 is located at the remote network location 760. The client devices, for example, may be mobile devices that are able to move to/from the various network locations depicted in the network environment 700. As one example, client device 728 may move from the first enterprise network location 720 and to the remote network location 760 or the second enterprise network location 745. The client devices 728 and 765 may represent different clients described in connection with FIGS. 1-6 including, for example, devices 107 or 109 of FIG. 1; devices 240 of FIG. 2; mobile device 502 from FIG. 5; or mobile device 602.

Each of the client devices 728 and 765 may be able to communicate or connect to the computing platform 710 or to specific services of the computing platform 710. Indeed, as depicted in FIG. 7, each of the client devices 728 and 765 may be able to communicate or connect to the application store 716 and the gateway 718. Further, via the gateway 718, each of the client devices 728 and 765 may be able to communicate with the resources 725, 730 and 750. Indeed and as one example, client device 728 may, via the gateway 718, communicate with the third resource 750. To communicate with the computing platform 710 and/or a resource 725, 730 and 750, a client device may be executing one or more applications that enable access to the cloud-based services (e.g., a Citrix Receiver by Citrix Systems and an HDX Engine by Citrix Systems).

As mentioned above, the gateway 718 may introduce undesirable latency in the communications between a resource and a client device, and may act as an additional point of failure in the system. As an example, the first resource 725 and the client device 728 are depicted as being at the same network location, while the gateway 718 is at a different network location. A communication from the client device 728 and to the resource 725 via the gateway 718 travels from the first enterprise network location 720, to the external network location 705 and then back to the first enterprise network location 720. Such a journey may introduce latency. This latency may be reduced by bypassing the gateway 718. One example where the gateway 718 may be bypassed is when an application session involves a client device and resource that are at the same network location, or are otherwise able to communicate with each other using a local network. Further, by bypassing the gateway 718, communications between the resource and the client device may proceed without disruption if the gateway malfunctions or is otherwise disrupted from operating in a normal fashion. For example, the local network of the gateway 718 may be congested and this may cause some communications sent to the gateway 718 to be lost. If the client device 728 bypasses the gateway 718 (e.g., by directly communicating to the resource 725 via the local network of the first enterprise network location 720), the client device 728 may be unaffected by the congestion affecting the gateway 718.

The example network environment 700 illustrates that client device 728, the first resource 725 and the second resource 730 are all located at the first enterprise network location. Because the client device 728 and the first resource 725 are at the same network location, they may be able to communicate with each other using the local network of the first enterprise network location 720, such as an intranet. Connections 736-742 illustrate the ability for the client device 728 to communicate with the first resource 725 and the second resource 730. Thus, the client device 728 may, using the local network of the first enterprise network location 720, be able to communicate with each connecter and each host of the resources 725 and 730 at the first enterprise network location 720. As will be described in more detail below, these communications may allow for the client device 728 to perform an application session with resources 725 or 730 using a connection that bypasses the gateway 718. One way to bypass the gateway 718 is to have the client device 728 perform the application session by using the local network of the first enterprise network location 720. Using the local network of the first enterprise network location 720 may allow for the client device 728 to directly communicate with the host 729 or 734 (as represented by connections 740 and 742, respectively).

Additional details and variations of the depicted arrangement will be discussed below in connection with the remaining figures and, in particular, in connection with the FIGS. 8A-8D, 9A-9C, 10A-10D, and 11. Moreover, the example network environment 700 depicts only one example arrangement of network locations. Many other variations are possible. For example, the computing platform 710, instead of being located at the external network location 705, could be located at a different network location, such as the second enterprise network location 745. As another example, instead of including only one gateway 718, the system may include multiple gateways (e.g., one at the first enterprise network location 720 and a second at the second enterprise network location 745). To choose which gateway to communicate with, the client device may first ping each gateway and select the gateway to which latency is lower. As yet another example, there may be additional network locations including additional external, enterprise and remote network locations.

FIGS. 8A-8D illustrate an example flow where a client device determines and/or updates an indication of identified resource groups. For simplicity, the example flow of FIGS. 8A-8D is illustrated based on the network environment 700 of FIG. 7. In particular, the example flow of FIGS. 8A-8D includes the client device 728, the application store 716, the configuration 712, the broker 714, the first resource 725, the second resource 730, the third resource 750, and the connector for each of the three resources (cloud connectors 727, 732, and 752, respectively).

Figure 8A:
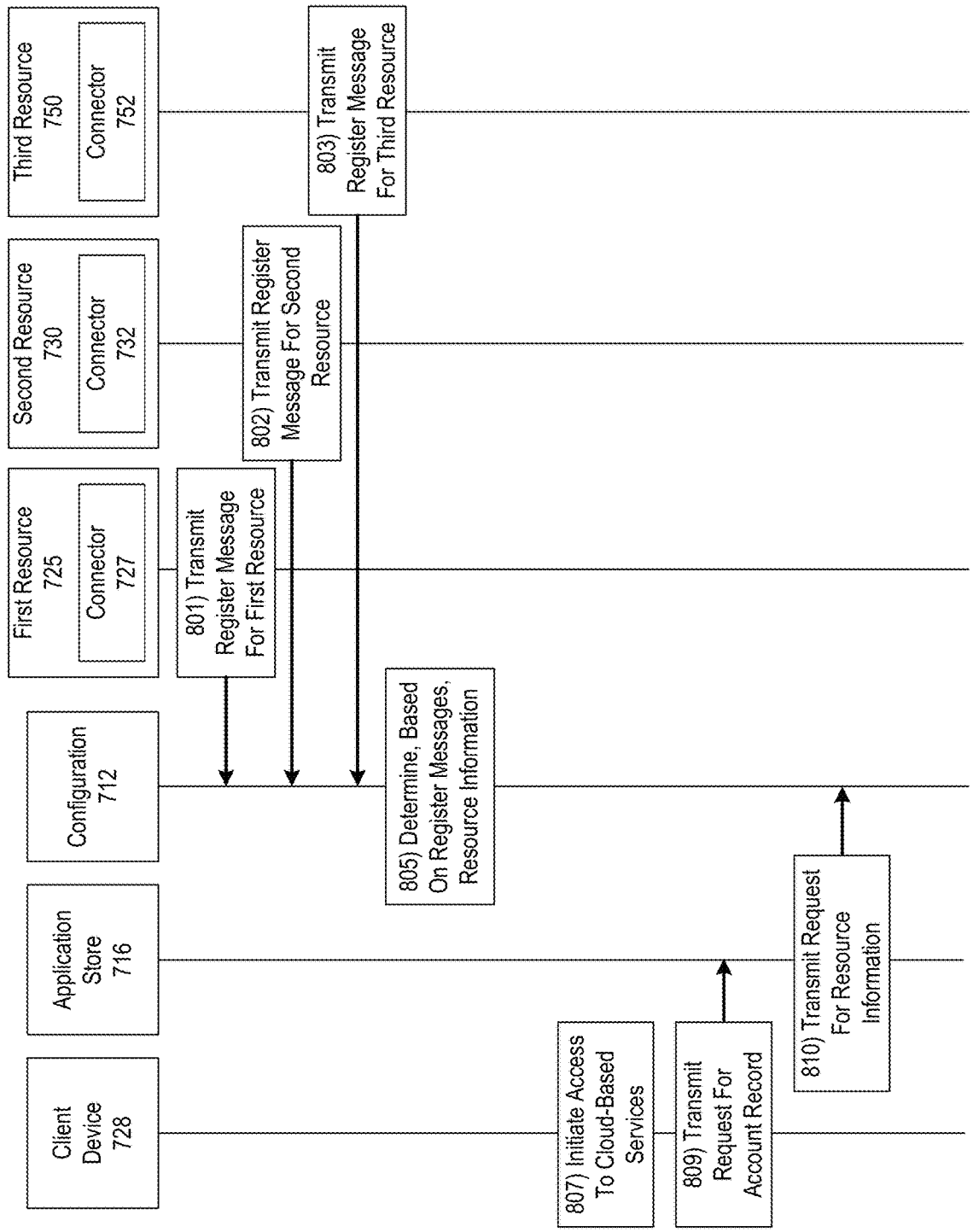
FIGS. 8A-8D illustrate an example flow where a client device determines and updates an indication of identified resource groups.

In FIG. 8A, the flow begins with the three resources registering with the cloud configuration 712. Thus, at 801-803, each of the first resource 725, the second resource 730 and the third resource 750, may transmit a register message to the configuration 712. The register message may allow a resource to join a pool of available resources for the cloud-based services. Each register message may include the address information for the resource, and other identifiers associated with the resource. For example, the register message for the first resource 725 may include one or more network addresses or host names for the first resource 725. In particular, the register message for the first resource 725 may include an IP address for the connector 727 and an IP address for the host 729, a network address (e.g., IP or multicast address) for a resource group associated with the first resource 725, and an identifier for the resource group associated with the first resource 725. Resources may also register with the broker 714 (not shown).

At 805, the configuration 712 may determine, based on the register messages transmitted at 801-803, resource information. The resource information may include the address information for the resources and/or the resource groups. As one example, the resource information may include an IP address for the connector 727, an IP address for the host 729, an IP address for the connector 732, an IP address for the host 734, an IP address for the connector 752, and an IP address for the host 754, and network addresses for each of the three resource groups associated with the resources 725, 730 and 750. As a reminder, for simplicity, the examples discussed throughout this disclosure assume each resource 725, 730 and 750 are associated with its own resource group. The resource information may include an identifier of each resource group (e.g., a first identifier of the first resource group associated with the first resource 725, a second identifier of the second resource group associated with the second resource 730, and a third identifier of the third resource group associated with the third resource 750).

Additionally, the addresses for the resource groups may be determined by the configuration 712 (instead of being include in the register messages). In such examples, the configuration 712 may determine, based on the register messages, a listing of identifiers of resource groups (e.g., one entry for each unique identifier of a resource group). For each entry on the list, the configuration 712 may determine a network address for the resource group (e.g., assign a multicast address to the resource group). Additionally, while not shown in the flow of FIG. 8A, the configuration 712 may transmit messages indicating the address of the resource group to the resources so, for example, the resources are informed of the address of the resource group to which they belong (e.g., a message indicating the address for the first resource group may be transmitted to the resource 725, a message indicating the address for the second resource group may be transmitted to the resource 730, and a message indicating the address for the third resource group may be transmitted to the resource 750).

At 805, the broker 714 may transmit the resource information. The resource information may be transmitted to the configuration 712.

At 807, the client device 728 may initiate access to one or more cloud-based services. This may be performed by a user selecting or otherwise directing the client device 728 to execute one or more applications that enable access to the cloud-based services.

At 809, in association with enabling access to the one or more cloud-based services, the client device 728 may transmit a request for an account record. This request may be transmitted to the application store 716.

At 810, the application store 716 may, based on the request for the account record, transmit a request for resource information. This request may be transmitted to the configuration 712.

At 811, the configuration 712 may transmit, as a response to the application store 716's request at 809, the resource information.

Figure 8B:
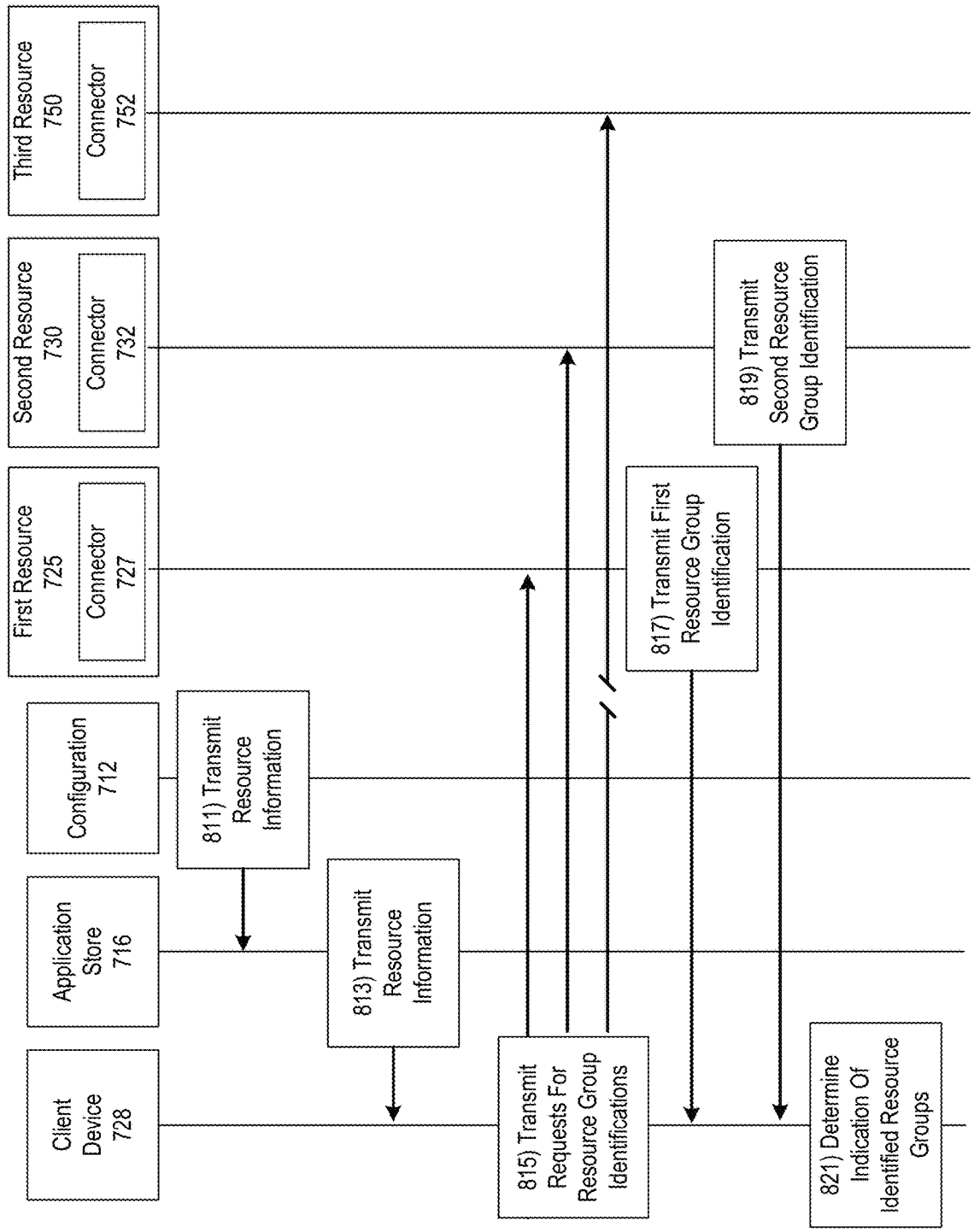

Continuing at FIG. 8B, at 813, the application store 716 may transmit, as a response to the client device 728's request at 809, the resource information. The resource information may be appended as part of an account record, or may be formatted and transmitted as its own data structure. An account record may include metadata that is configured to allow the client device 728 to initiate accesses and/or launches to the resources and applications. In some examples, the application store 716 may transmit a portion of the resource information to the client device 728. For example, the application store 716 may transmit one or more messages that include the address information for each connector associated with the resources (e.g., addresses for connectors 727, 732 and 752); the address information for the resource groups (e.g., the addresses for the first, second and third resource groups); and the identifiers of the resource groups (e.g., the identifiers for the first, second and third resource groups).

At 815, the client device 728 may transmit one or more requests for resource group identification. The client device may transmit the one or more requests based on the resource information received at 813. For example, if the resource information includes network addresses for three resource groups, the client device 728 may transmit three requests, one for each resource group. Each request includes the address information of the respective resource group. As depicted in the example flow of FIG. 8B and based on the three resource groups, the client device performs, via the local network of the first enterprise network location 720, transmissions of three requests for resource group identification: one for the first resource group, one for the second resource group, and one for the third resource group. Each transmission may be performed using asynchronous or multicast communication techniques. As depicted in the example flow of FIG. 8B, a request for resource group identification is received by the first resource 725 and the second resource 730 (as indicated by the unbroken lines), but not the third resource 750 (as indicated by the broken lines). This is because the example network environment 700 depicts that client device 728 is located at the same network location as the first resource 725 and the second resource 730. By being located at the same network location as the first resource 725 and the second resource 730, the transmission of the request for the first resource group would be received by the first resource 725 and the transmission of the request for the second resource group would be received by the second resource 730. However, because the third resource 750 is not located at the same network location as the client device 728, the request for the third resource group would not be received by the third resource 750. Additionally, as depicted in the example flow of FIG. 8B, the connectors of each resource, due to the services for the resource groups being configured as part of the connectors, may receive the request for resource group identification.

Upon receiving a request for resource group identification, the resource may respond with a resource identification. Thus, based on the first resource 725 being located at the same network location as the client device 728, at 817, the first resource 725 may transmit, to the client device 728, a first resource group identification, which includes the identifier of the first resource group. Based on the second resource 730 being located at the same network location as the client device 728, at 819, the second resource 730 may transmit, to the client device 728, a second resource group identification, which includes the identifier for the second resource group. Based on the third resource 750 being located at a different network location, the third resource 750, based on non-receipt of a request for resource identification, may not transmit its resource group identification. Further, due to the services for the resource groups being configured as part of the connectors, the connector 727 may transmit the first resource group identification and the connector 732 may transmit the second resource group identification.

Based on one or more resource group identifications that are received, the client device 728 may, at 821, determine an indication of identified resource groups. The indication of identified resource groups may indicate which resource groups the client device 728 is able to communicate with if the gateway 718 is bypassed. In other words, the indication of identified resource groups may indicate which resources the client device 728 is able to communicate with using a local network of a network location. For example, as depicted in the example flow of FIG. 8B, based on receiving the first resource group identification and the second resource group identification, the client device 728 may determine the indication of identified resource groups to indicate the first resource group associated with first resource 725 and the second resource group associated with the second resource 730. Thus, the indication of identified resource groups indicates that the client device 728 is able to communicate with the first resource 725 and the second resource 730 and the gateway 718 may be bypassed for those two resource groups. The indication of identified resource groups may include the identifiers for each identified resource group (e.g., the indication of identified resource groups may include the identifier of the first resource group and the identifier of the second resource group.

Figure 8C:
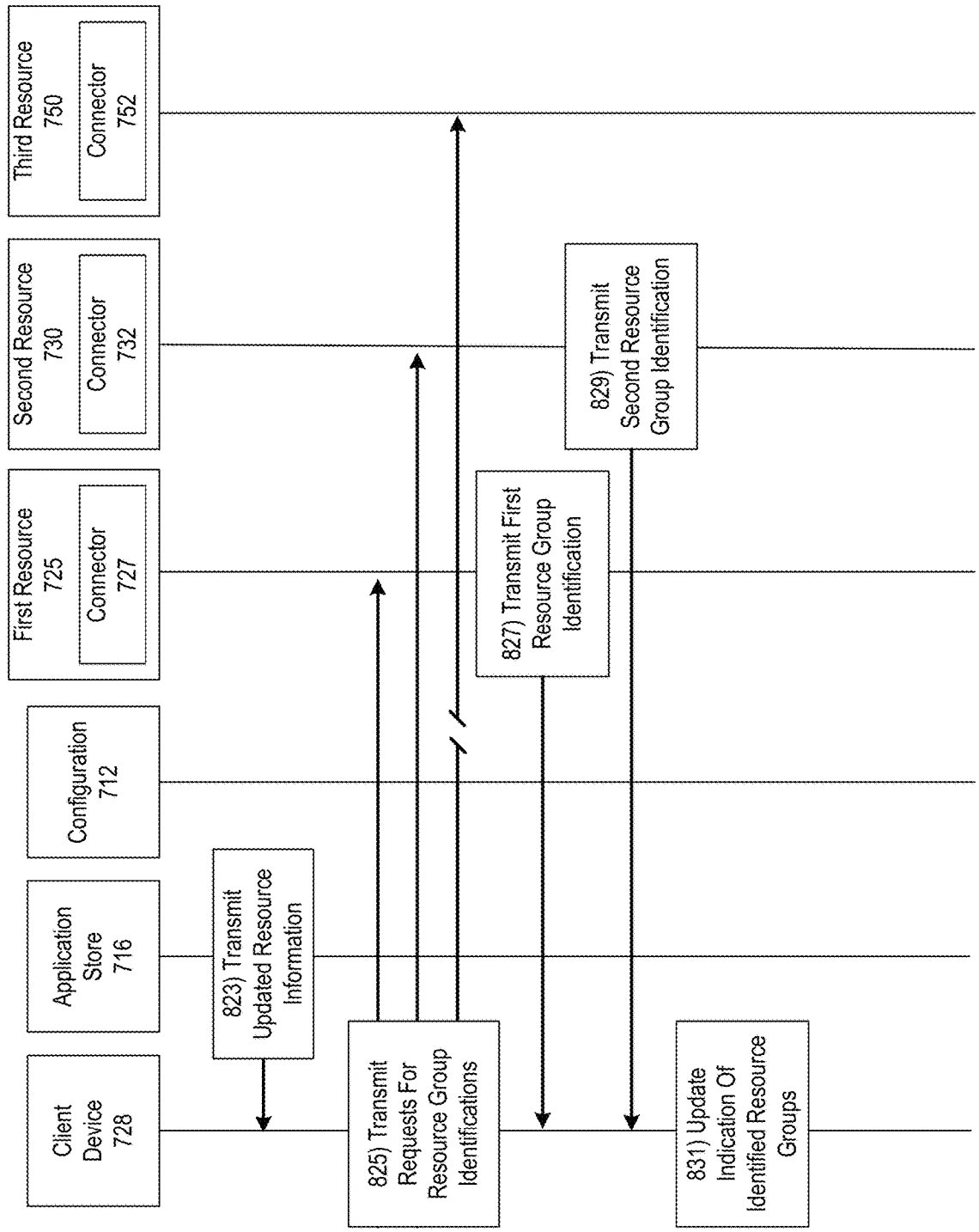
Figure 8D:
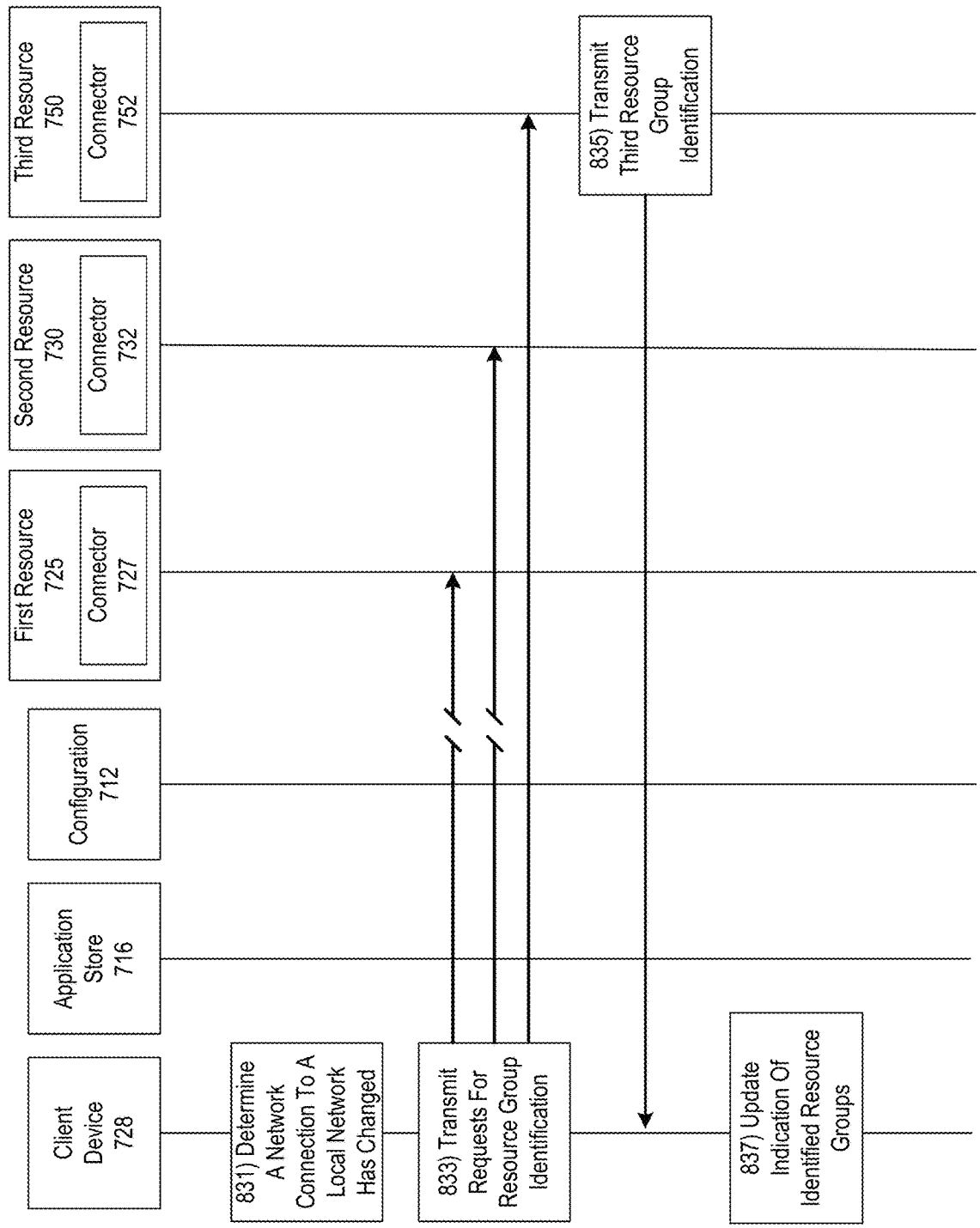

The example flows of FIGS. 8C and 8D depict examples that cause an update to the indication of identified resource groups based on a change in a network condition. In particular, the example flow of FIG. 8C depicts an example where the indication of identified resource groups is updated based on a change in address information for a resource. In particular, the example of FIG. 8C is depicted as being performed based on a change in address information for the first resource 725. The example flow of FIG. 8D depicts an example where the indication of identified resource groups is updated based on a change to a network connection to a local network of a network location. In particular, the example of FIG. 8D is depicted as being performed based on the client device 728 moving from the first enterprise network location 720 to the second enterprise network location.

Continuing with the example flow of FIG. 8C, at 823, the application store 716 may transmit, to the client device 728, an updated resource information. The updated resource information may be transmitted as part of a periodic update to the account record.

The updated resource information may, as compared to the resource information transmitted at 813, indicate one or more changes to the resources registered for service, one or more changes to the address information of the resources, or the like. For example, the first resource 725 may transmit a register message that indicates a change in address information for the first resource (e.g., the connector 727 or the resource group for the first resource 725 may, by a network operator or via a periodic address leasing scheme, have been assigned a new network address and the register message may be transmitted to indicate the change to the broker 714). Based on the indicated change, the broker 714 may determine updated resource information. The updated resource information may indicate the new address information for the first resource 725. The updated resource information may be transmitted, via the configuration 712, to the application store 716.

At 825, the client device 728 may, based on the updated resource information, transmit one or more requests for resource group identification. As depicted in the example flow of FIG. 8C, the client device 728 remains at the first enterprise network location 720. Thus, the transmission from the client device 728 would be received by the first resource 725 and the second resource 730. However, because the third resource 750 remains not located at the same network location as the client device 728, the transmission would not be received by the third resource 750.

Based on receipt of the request for resource group identification, at 827, the first resource 725 may transmit, to the client device 728, a first resource identification. Based on receipt of the request for resource group identification, at 829, the second resource 730 may transmit, to the client device 728, a second resource identification.

Based on receipt of the first resource group identification and the second resource group identification, the client device 728 may, at 831, update the indication of identified resource groups. As depicted, after the update, the indication of identified resource groups may include an identifier of the first resource group and an identifier of the second resource group.

Continuing with the example flow of FIG. 8D, at 831, the client device 728 may determine that a network connection to a local network has changed. This determination may be performed based on the client device 728 disconnecting from a local network of a network location or based on the client device 728 connecting to a local network of a new network location. For example, the example flow of FIG. 8D is depicted based on the client device moving from the first enterprise network location 720 and to the second enterprise network location 745. Thus, based on this move, the client device 728 may disconnect from the local network of the first enterprise network location 720 and may connect to the local network of the third enterprise network location 745. The client device 728 may determine a network connection has changed based on the disconnection from the local network of the first enterprise network location 720 or the connection to the local network of the third enterprise network location 745.

At 833, the client device 728 may, based on determining a network connection to a local network has changed, transmit one or more requests for resource group identification. Due to the change in network location, the client device 728 is now located at the same network location as the third resource 750. Thus, the transmission from the client device 728 would be received by the third resource 750. However, because the first resource 725 and the second resource 730 are not located at the same network location as the client device 728 after the move, the transmission would not be received by the first resource 725 nor the second resource 730 (as indicated by the broken lines).

Based on the third resource being located at the same network location as the client device 728 after the move, at 835, the third resource 750 may transmit, to the client device 728, a third resource identification.

Based on the third resource identification, the client device 728 may, at 837, update the indication of identified resource groups. As depicted, after the update, the indication of identified resource groups may include an identifier of the third resource group.

While FIGS. 8C and 8D depict two examples that cause an update to the indication of identified resource groups, the indication of identified resource groups may be updated based on other network conditions. For example, an update to the indication of identified resource groups may be updated based on a resource being de-registered from the cloud-based services (the de-registered resource may be removed from the indication of identified resource groups), or if a client device moves from an enterprise network location to a remote network location (the indication of identified resource groups may be updated to indicate that the client device 728 can not communicate with any of the resources if the gateway 718 is bypassed).

Figure 9A:
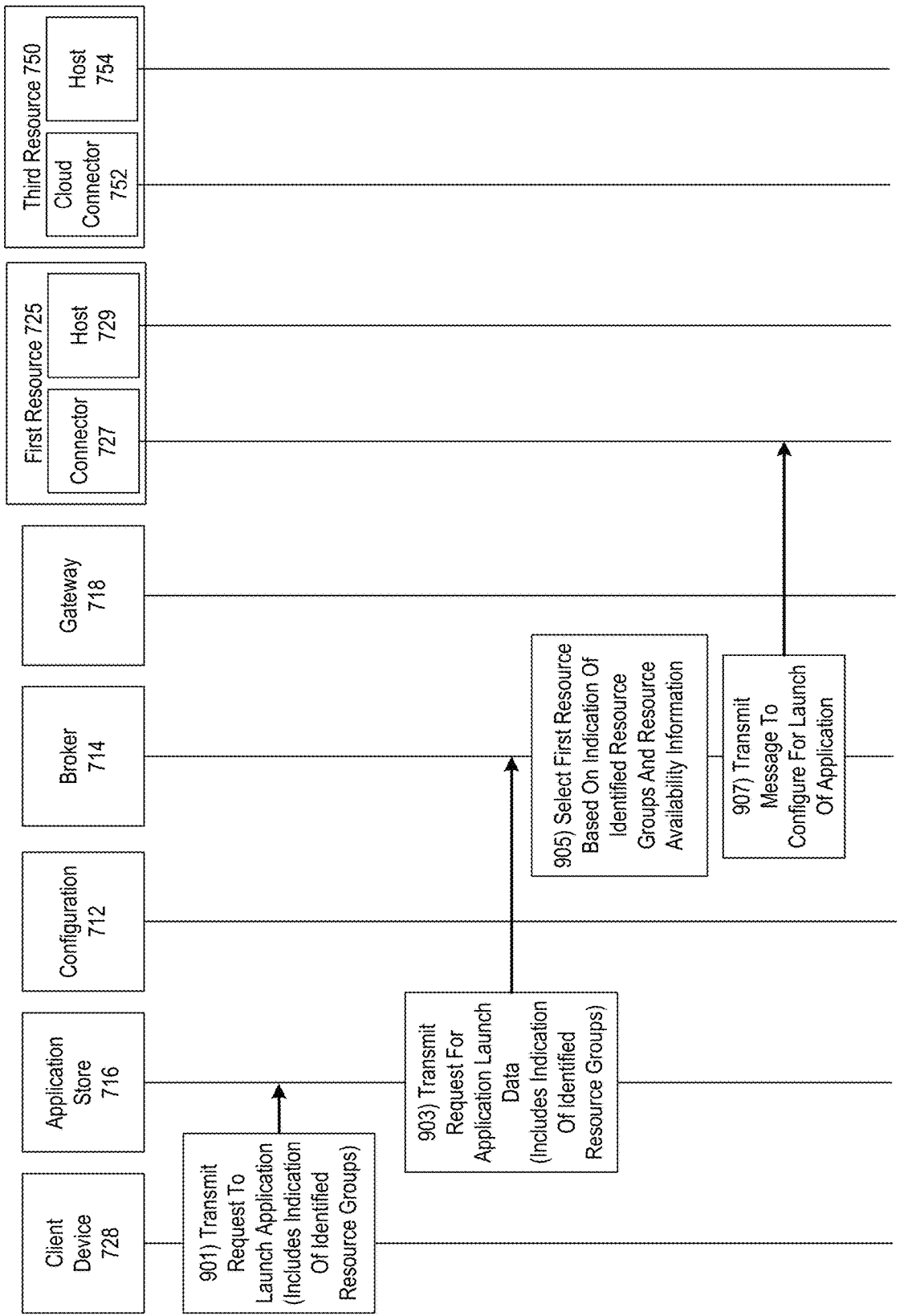
FIG. 9A-9C illustrate an example flow where a client device, based on the indication of identified resource groups, accesses a resource by using a connection that bypasses a gateway.
Figure 9B:
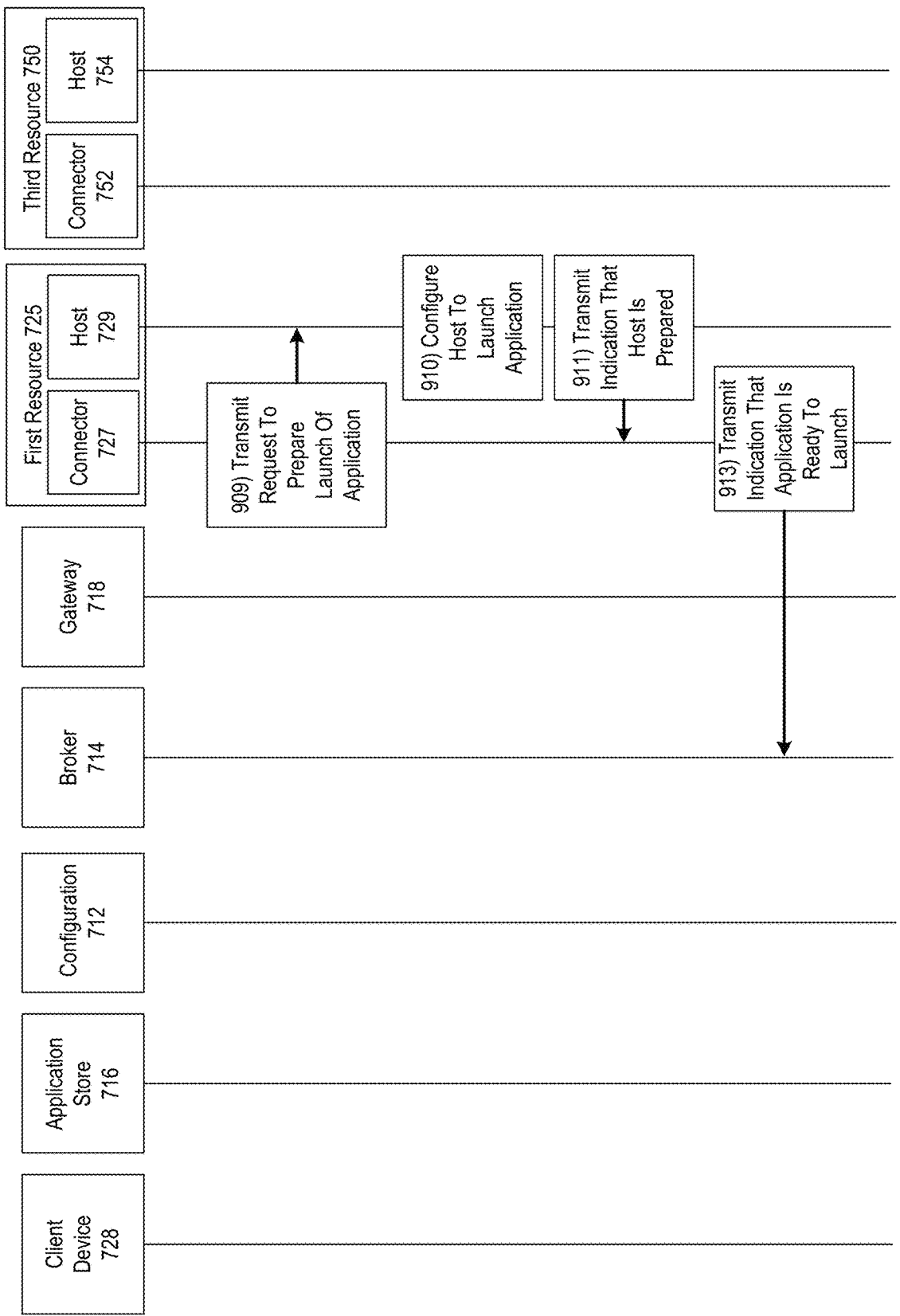
Figure 9C:
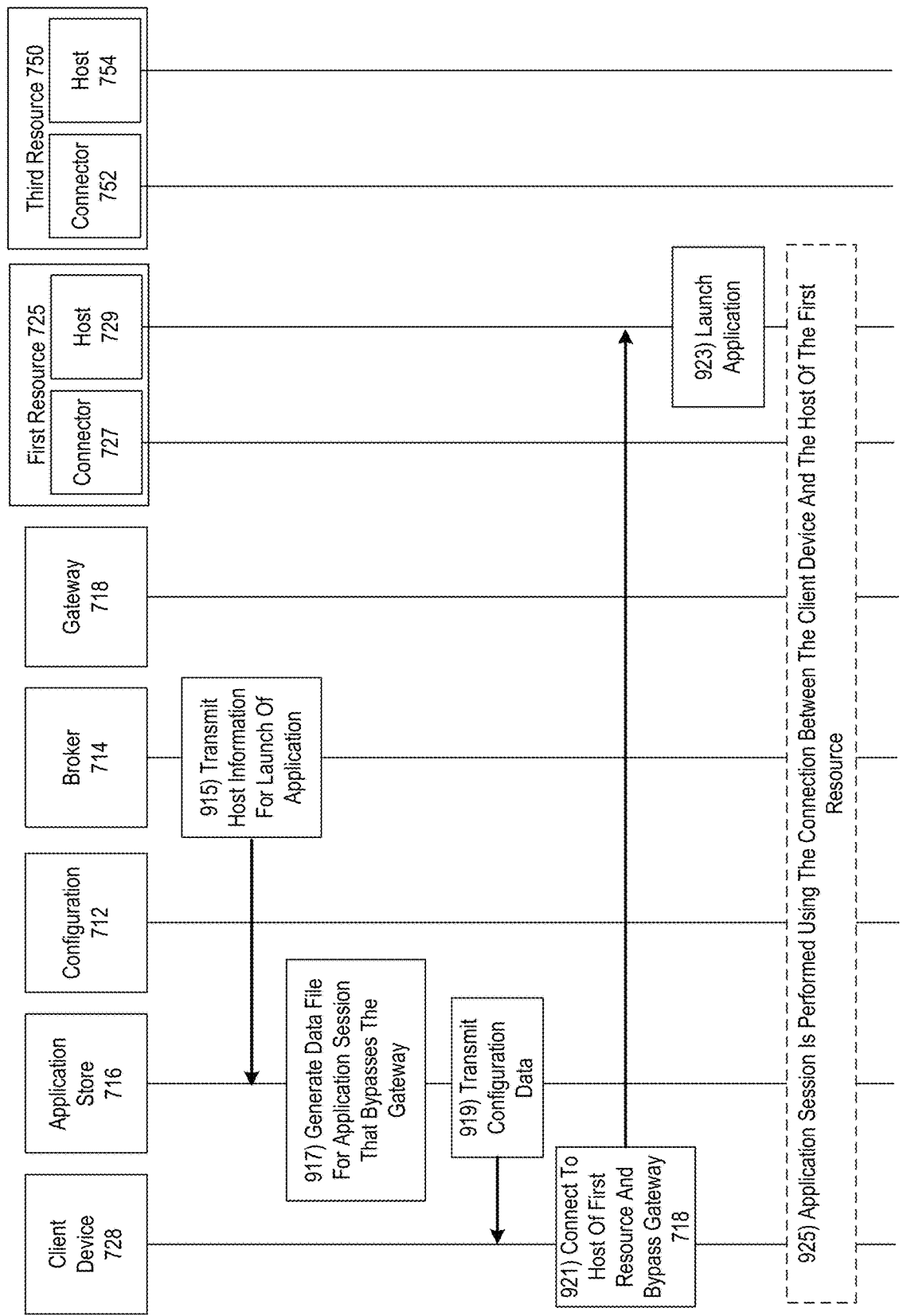

The example flow of FIGS. 8A-8D depict examples where an indication of identified resource groups for a client device is determined and/or updated. The example flows of FIGS. 9A-9C and 10A-10D depict examples where the indication of identified resource groups may be used as a basis for determining whether to access a resource using a connection to a gateway or using a connection that bypasses the gateway. In particular, the example flow of FIGS. 9A-9C depicts an example where a client device, based on the indication of identified resource groups, accesses a resource by using a connection that bypasses the gateway. The example flow of FIGS. 10A-10D depicts an example where a client device, based on the indication of identified resource groups, accesses a resource by using a connection to the gateway.

Beginning with the example flow of FIGS. 9A-9C, for simplicity, the example flow of FIGS. 9A-9C is illustrated based on the network environment 700 of FIG. 7. In particular, the example flow of FIGS. 9A-9C includes the client device 728, the application store 716, the configuration 712, the broker 714, the gateway 718, the first resource 725, the third resource 750, the connector 727 for the first resource 725, the host 729 for the first resource 725, the connector 752 for the third resource 750, and the host 754 for the third resource 750.

At 901, the client device 728 may transmit a request to launch an application. This request may include the indication of identified resource groups. This request may be transmitted to the application store 716. Additionally, the transmission of the request may be based on a user selection of the application via a user interface of the client device 728. The application may be hosted by the cloud-based services.

To provide a particular example in the flow of FIGS. 9A-9C, the indication of identified resource groups will be discussed in terms of indicating the first resource 725 and the second resource 730. In other words, for the example flow of FIGS. 9A-9C, the indication of identified resource groups indicates that the client device 728 can communicate with the first resource 725 and the second resource 730 if the gateway 718 is bypassed. Such an indication of identified resource groups may occur, for example, if the client device 728, the first resource 725 and the second resource 730 are all located at the first enterprise network location 720.

At 903, the application store 716 may, based on the request to launch the application, transmit a request for application launch data. The application launch data may include information indicating which resource and/or host may be assigned to launch and/or execute the application. This request may include the indication of identified resource groups. This request may be transmitted to the broker 714.

In general, to initiate preparation of the application launch data, the broker 714 may select, based on the indication of identified resource groups and resource availability information, a resource for executing the application. For example, the resource availability information may indicate which resources are available for executing the application (e.g., has processor capacity that can be allocated for the application). The indication of identified resource groups may indicate which resources the client device 728 can communicate with if the gateway 718 is bypassed. The broker 714 may attempt to select a resource from the resource availability information based on a prioritization of bypassing the gateway.

For example, the broker 714 may first analyze the resource availability information to determine which resources are available for executing the application. The resources that are available for executing the application may also be referred to as available resources. The resource availability information may be tracked and managed by the broker 714 as applications are launched and/or hosts are assigned. Additionally, each resource may indicate which hosts are currently executing an application, or may indicate which hosts are part of the resource's current pool of hosts. Based on this information, the broker 714 may determine which resources are available for executing the application. For example, a resource may be available if it has at least one host that is capable of executing the application and is idle (e.g., not currently executing an application).

The broker 714 may then compare the available resources to those indicated by the indication of identified resource groups. If a resource is both available and indicated by the indication of identified resource groups, the broker 714 may select that resource for executing the application. In other words, the broker 714 may prioritize selection of a resource that is both available for executing the application and for which the gateway can be bypassed. If at least two of the available resources happen to be indicated by the indication of identified resource groups, the broker 714 may select from those based on a load balancing process (e.g., select the resource with the most remaining capacity). If none of the available resources happen to be indicated by the indication of identified resource groups, the broker 714 may select one of the available resources based on a load balancing process or based on network health conditions (e.g., select a resource that is geographically closest to the client device 728).

As depicted in the example flow of FIG. 9A, at 905, the broker 714 may select, based on the indication of identified resource groups and the resource availability information, the first resource 725 to execute the application. The selection of the first resource 725 may have resulted from the indication of identified resource groups and the resource availability information both indicating the first resource 725. In other words, the first resource 725 may be selected based on the client device 728 being able to communicate with it if the gateway 718 is bypassed and based on the resource 725 being available for executing the application. Additionally, based on selection of the resource, the broker 714 may determine address information (e.g., an IP address) for the host that will launch and execute the application.

At 907, the broker 714 may transmit a message to configure for the launch of the application. The message, based on the selection of the first resource 725, may be transmitted to the first resource 725. The message may include the network address for the host and an identifier for the application that is to be launched. As depicted in FIG. 9A, the broker 714 may transmit the message to the connector 727 of the first resource 725.

Continuing the example flow at FIG. 9B, at 909-913, the first resource 725 may configure to launch the application. As depicted in the example flow of FIG. 9B, the first resource 725 may perform this configuration using the connector 727 and the host 729. For example, at 909, based on receiving the request to configure for the launch of the application, the connector 727 may transmit, to the host 729, a request to prepare the launch of the application. At 910, the host 729 may configure itself to launch the application. This may include allocating resources (e.g., instantiating and/or assigning a virtual machine) for executing the application. Upon successful configuration, at 911, the host 729 may transmit an indication that the host is prepared for the application. At 913, the connector 727 may, based on receiving the indication from the host 729, transmit an indication that the application is ready for launch. The indication at 913 may be transmitted to the broker 714.

Continuing the example flow at FIG. 9C, at 915, the broker 714 may, based on receiving an indication that the application is ready for launch from the first resource 725, transmit host information for the launch of the application. The host information may include the address information of the host that will execute the application. Additionally, the host information may indicate whether the gateway 718 is to be bypassed or not, and/or include an identifier of a resource group (e.g., if host 729 is to launch the application, the host information may include the identifier of the first resource group associated with the first resource 725). The host information may indicate one or more capabilities of the host including, for example, whether the host supports certain types of encryption, VPN connections or microVPN connections. In the example of FIG. 9C, the host information may include the address information of host 729 and an indication that the gateway 718 is to be bypassed. The host information may be transmitted to the application store 716 and may represent a response to the application store 716's request for application launch data.

The application store 716 may, based on the host information, generate configuration data. The configuration data may include the information necessary for a client device to establish a connection to the gateway or the resource. The connection, once established, may be used by the client device during the application session. The configuration data can indicate use of a few different types of connections. For example, the configuration data may indicate that the client device 728 is to establish a connection to the gateway 718, or is to establish a connection that bypasses the gateway 718. The configuration data may further indicate various security mechanisms associated with the connection including, for example, whether the connection is to use a particular type of encryption, use a VPN connection, or is to use a MicroVPN connection. The configuration data may be a configuration file, such as an Independent Computer Architecture (ICA) file.

The application store 716 may determine which type of connection is to be used based on any indications included in the host information (e.g., an indication of an capability of the host or an indication that the gateway is to be bypassed). The application store 716 may further determine which type of connection is to be used based on its own analysis of the host information and the indication of identified resource groups. For example, the application store 716 may extract an identifier of a resource group from the host information and determine that the indication of identified resource groups includes a matching identifier. Based on the match, a connection that bypasses the gateway may be used. Further, the application store 716 may request additional information that is used to generate the configuration data (e.g., 1017-1019 of FIG. 10C).

As depicted in the example flow of FIG. 9C, at 917, the application store 716 may generate configuration data for an application session that bypasses the gateway 718. This configuration data may have resulted from the first resource 725 being selected to execute the application and based on the first resource 725 being one of the resources indicated by the indication of identified resource groups. In other words, configuration data for an application session that bypasses the gateway 718 may be determined based on the resource that executes the application—in this example, the first resource 725—and the client device 728 being located at the same network location.

At 919, the application store 716 may transmit, to the client device 728, the configuration data. This configuration data may represent a response to the client device 728's request to launch the application.

The client device 728 may, to access the application being executed by the first resource 725, establish a connection of the type indicated by the configuration data. As depicted in the example flow of FIG. 9C, at 921, the client device 728 may, based on the configuration data, connect to the host 729 of the first resource 725 and may bypass the gateway 718 (e.g., connection 740 of FIG. 7). The connection to the host 729 may be an encrypted data connection (e.g., Transport Layer Security (TLS) encrypted connection), a VPN connection, or a microVPN connection. Additionally, the connection between the host 729 and the client device 728 may use the local network of the first enterprise network location 720 and not a wide area network that interfaces the first enterprise network location 720 to other network locations. In other words, data that is transmitted via the connection between the host 729 and the client device 728 may only use the networking resources (e.g., routers) of the first enterprise network location 720 and may not exit the first enterprise network location 720. In this manner, the client device 728 may bypass the gateway 718 by using a local network to connect to the first resource 725.

Based on the connection established between the first resource 725 and the client device 728, the first resource 725 may launch the application and allow access to the application by the client device 728. Thus, as depicted in the example flow of FIG. 9C, at 923, host 729 may launch the application. At 925, the application session may be performed using the connection between the client device 728 and the host 729 of the first resource 725. For example, if the application is a remote desktop application, the host 729 may transmit, via the connection that bypasses the gateway 718, an update to a user interface of the remote desktop application. Upon receiving the update, the client device 728 may regenerate a display to incorporate the update to the user interface of the remote desktop application. The update may, based on the connection between the host 729 and the client device 728, be transmitted using only network resources of the first enterprise network location 720, may not exit the first enterprise network location 720, and may bypass the gateway 718.

FIG. 10A-10D illustrate an example flow where a client device, based on an indication of identified resource groups, accesses a resource by using a connection to the gateway. For simplicity, the example flow of FIGS. 10A-10D is illustrated based on the network environment 700 of FIG. 7. In particular, the example flow of FIGS. 10A-10D includes the client device 728, the application store 716, the configuration 712, the broker 714, the gateway 718, the first resource 725, the third resource 750, the connector 727 for the first resource 725, the host 729 for the first resource 725, the connector 752 for the third resource 750, and the host 754 for the third resource 750.

At 1001, the client device 728 may transmit a request to launch an application. This request may include the indication of identified resource groups. This request may be transmitted to the application store 716. Additionally, the transmission of the request may be based on a user selection of the application via a user interface of the client device 728. The application may be hosted by the cloud-based services.

To provide a particular example in the flow of FIGS. 10A-10D, the indication of will be discussed in terms of including identifiers of the resource groups associated with the first resource 725 and the second resource 730. In other words, for the example flow of FIGS. 10A-10D, the indication of identified resource groups indicates that the client device 728 can communicate with the first resource groups associated with the first resource 725 and the second resource group associated with the second resource 730 if the gateway 718 is bypassed. Such an indication of identified resource groups may occur, for example, if the client device 728, the first resource 725 and the second resource 730 are all located at the first enterprise network location 720.

At 1003, the application store 716 may, based on the request to launch the application, transmit a request for application launch data. This request may include the indication of identified resource groups. This request may be transmitted to the broker 714.

At 1005, the broker 714 may select, based on the indication of identified resource groups and the resource availability information, the third resource 750 to execute the application. The selection of the third resource 750 may have resulted from the resource availability information indicating that the first resource 725 and the second resource 730 are not available for executing the application. In this example, the gateway 718 is unable to be bypassed because the first resource 725 and the second resource 730 are not available to execute the application. In other words, the third resource 750 may be selected based on the resource 750 being available for executing the application.

Figure 10A:
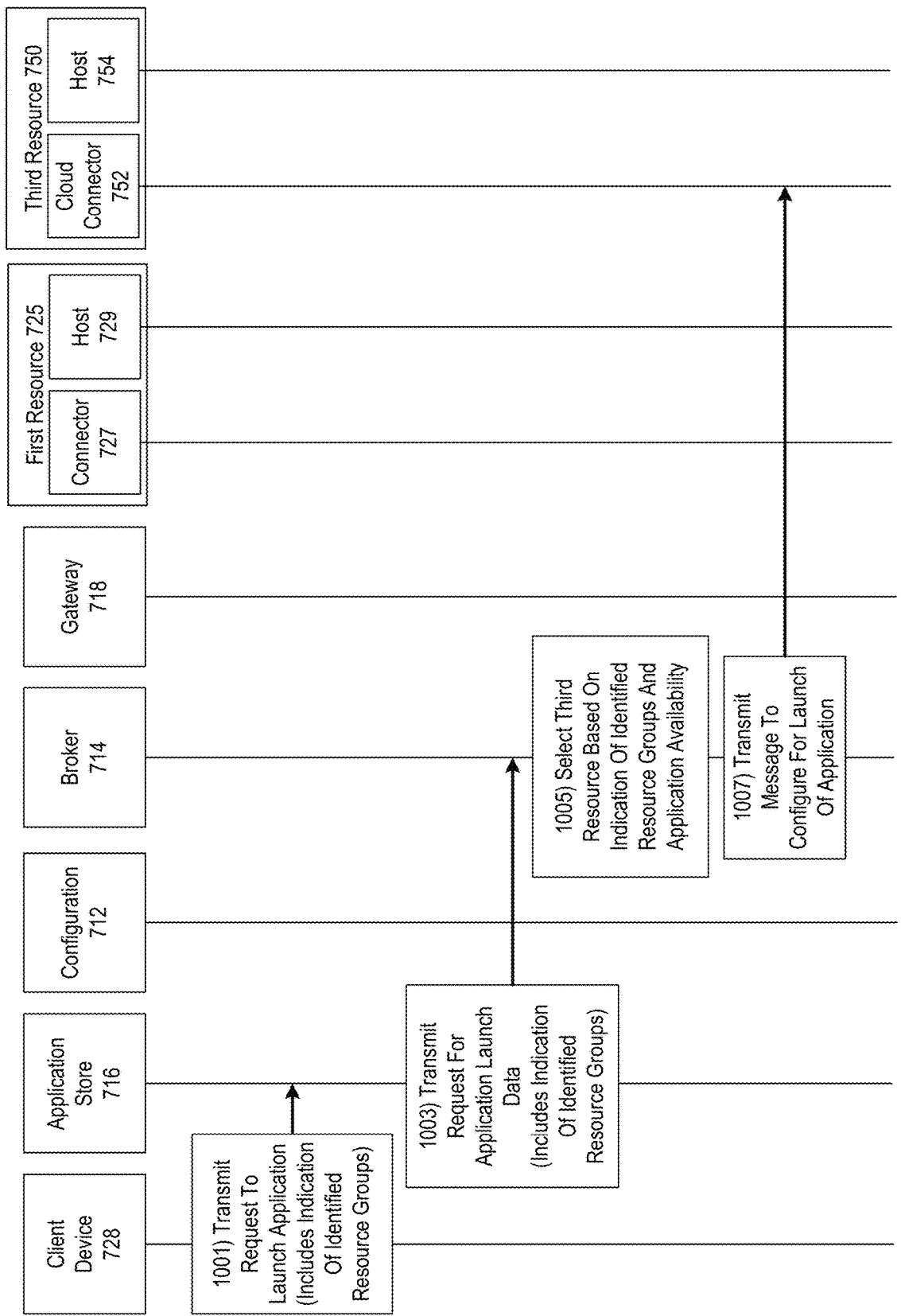
FIG. 10A-10D illustrate an example flow where a client device, based on an indication of identified resource groups, accesses a resource by using a connection to the gateway.

At 1007, the broker 714 may transmit a message to configure for the launch of the application. The message, based on the selection of the third resource 750, may be transmitted to the third resource 750. As depicted in FIG. 10A, the broker 714 may transmit the message to the connector 752 of the third resource 750.

Figure 10B:
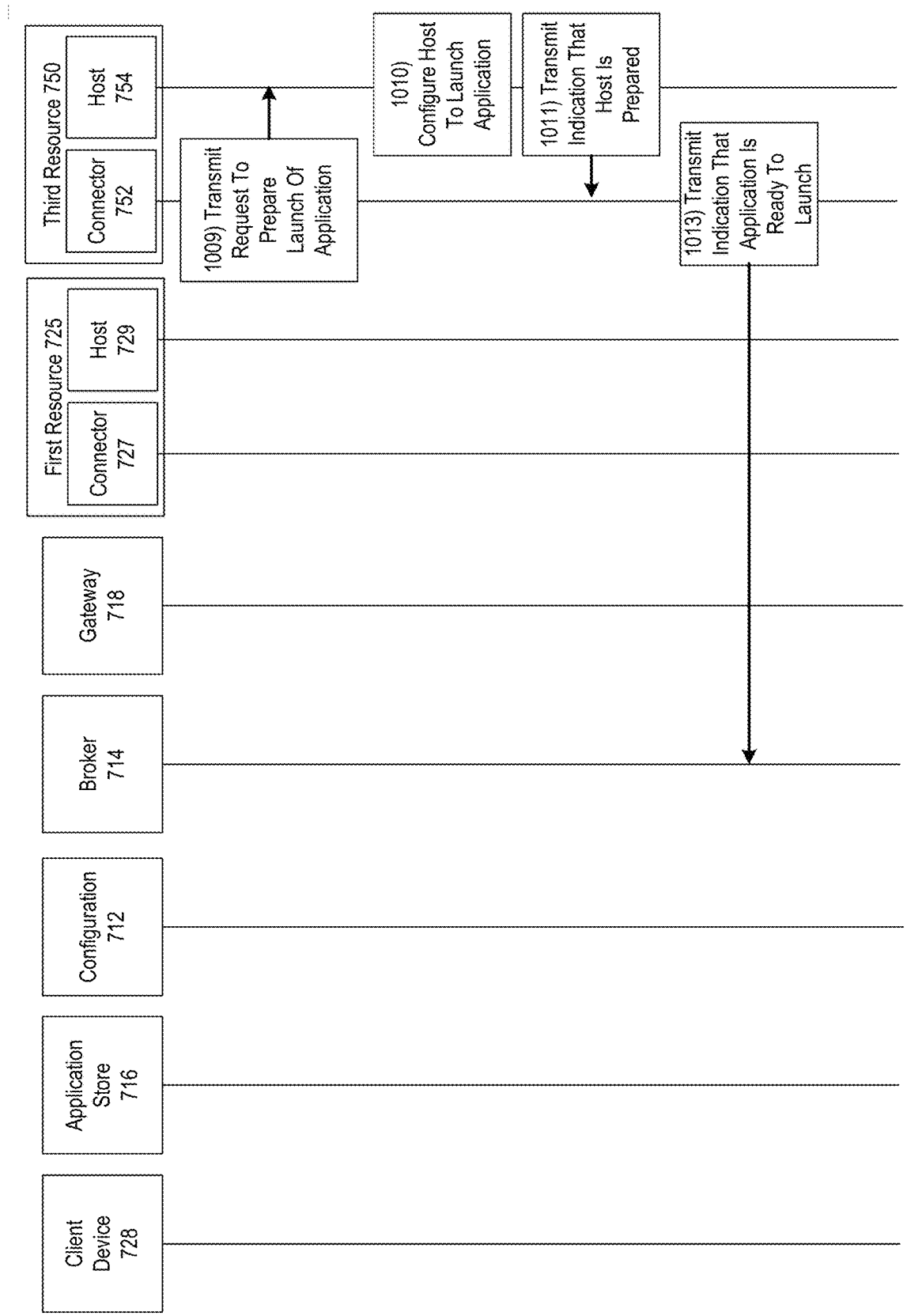

Continuing the example flow at FIG. 10B, at 1009-1013, the third resource 750 may configure to launch the application. As depicted in the example flow of FIG. 10B, the third resource 750 may perform this configuration using the connector 752 and the host 754. For example, at 1009, based on receiving the request to configure for the launch of the application, the connector 752 may transmit, to the host 754, a request to prepare the launch of the application. At 1010, the host 754 may configure itself to launch the application. This may include allocating resources (e.g., instantiating and/or assigning a virtual machine) for executing the application. Upon successful configuration, at 1011, the host 754 may transmit an indication that the host 754 is prepared for the application. At 1013, the connector 752 may, based on receiving the indication from the host 754, transmit an indication that the application is ready for launch. The indication at 1013 may be transmitted to the broker 714.

Figure 10C:
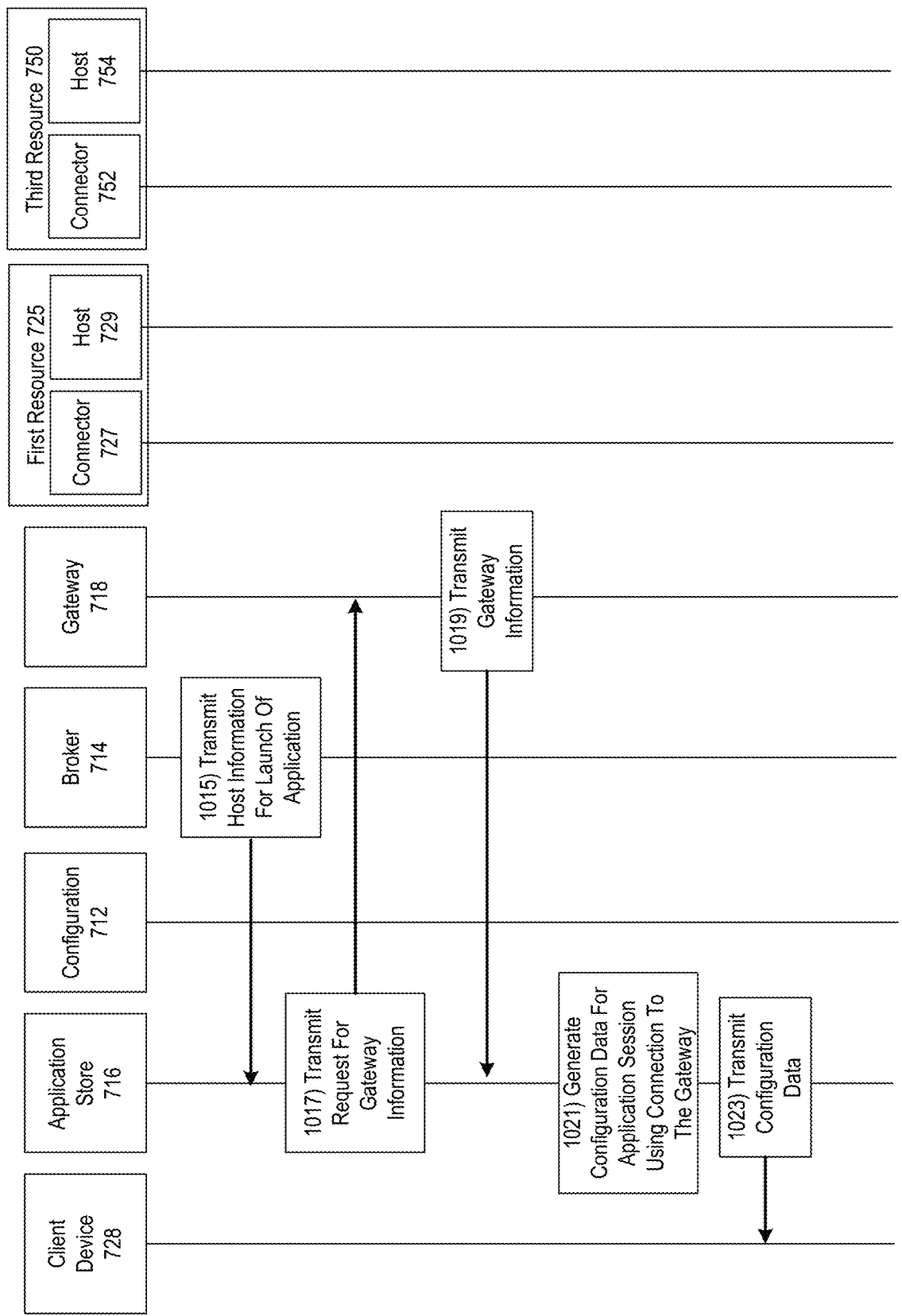
Figure 10D:
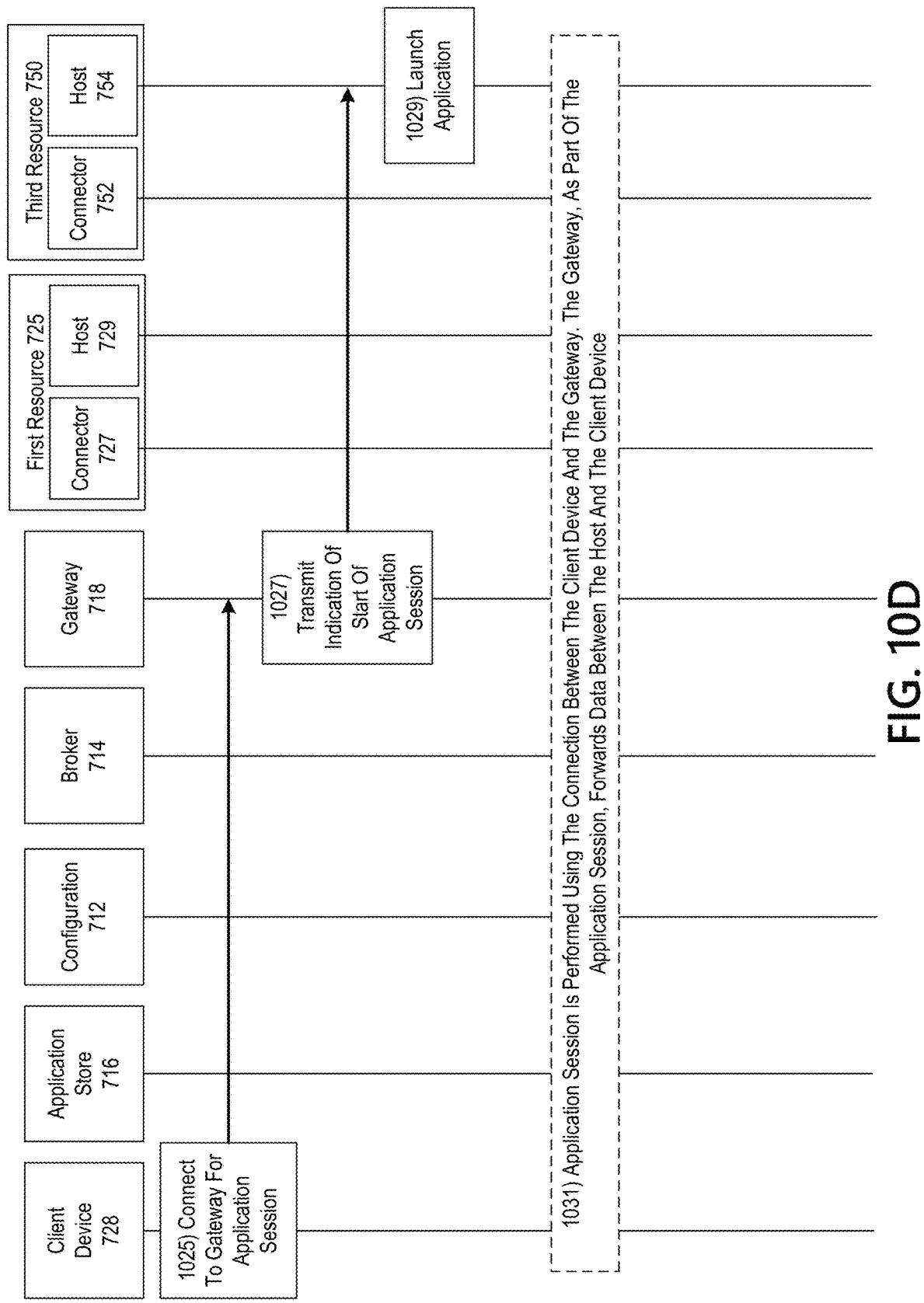

Continuing the example flow at FIG. 10C, at 1015, the broker 714 may, based on receiving an indication that the application is ready for launch from the third resource 750, transmit host information for the launch of the application. In the example of FIG. 10C, the host information may include the address information of host 754 and an indication that the gateway 718 is not to be bypassed. The host information may be transmitted to the application store 716 and may represent a response to the application store 716's request for application launch data.

In the example of FIG. 10C, based on the host information, the application store 716 may be generating configuration data for an application session that uses a connection to the gateway 718. However, the application store 716 may need to perform additional actions to prepare for the generation of the configuration data (as depicted at 1017-1019). Thus, as depicted at 1017, the application store 716 may transmit, to the gateway 718, a request for gateway information. As a response to the request, at 1019, the gateway 718 may transmit, to the application store 716, the gateway information. The gateway information may include the address information of the gateway. Additionally, the gateway information may include an indication of one or more capabilities of the gateway 718 including, for example, whether the gateway 718 supports certain types of encryption, VPN connections or microVPN connections.

At 1021, the application store 716 may generate configuration data for an application session that uses a connection to the gateway 718. This configuration data may have resulted from the third resource 750 being selected to execute the application and based on the third resource 750 not being one of the resources indicated by the indication of identified resource groups. In other words, configuration data for an application session that uses a connection to the gateway 718 may be determined based on the resource that executes the application—in this example, the third resource 750—and the client device 728 being located at different network locations.

At 1023, the application store 716 may transmit, to the client device 728, the configuration data. This configuration data may represent a response to the client device 728's request to launch the application.

The client device may, to access the application being executed by the third resource 750, establish a connection of the type indicated by the configuration data. As depicted in the example flow of FIG. 10D, at 1025, the client device 728 may, based on the configuration data, connect to the gateway 718 and the gateway 718 may forward data between the client device 728 and the third resource 750. The connection to the gateway 718 may be an encrypted data connection (e.g., Transport Layer Security (TLS) encrypted connection), a VPN connection, or a microVPN connection. Additionally, the connection between the gateway 718 and the client device 728 may use the local network of the first enterprise network location 720 and a wide area network that interfaces the first enterprise network location 720 to the external network location 705. In other words, data that is transmitted via the connection between the gateway 718 and the client device 728 may include networking resources additional to those of the first enterprise network location 720 and may exit the first enterprise network location 720.

Based on the connection established between the gateway 718 and the client device 728, the gateway 718 may transmit an indication of a start of the application session. This indication may be transmitted to the third resource 750 and, in particular, the host 754 of the third resource 750. Based on receiving the indication from the gateway 718, the third resource 750 may launch the application and allow access to the application by the client device 728. Thus, as depicted in the example flow of FIG. 10D, at 1029, host 754 may launch the application. At 1031, the application session may be performed using the connection between the client device 728 and the gateway 718. The gateway 718, as part of the application session, may forward data between the host 754 and the client device 728. For example, if the application is a remote desktop application, the host 754 may transmit, to the client device 728 and via the gateway 718, an update to a user interface of the remote desktop application. Upon receiving the update, the client device 728 may regenerate a display to incorporate the update to the user interface of the remote desktop application. The update may, based on the connection between the gateway 718 and the client device 728, be transmitted using network resources of the first enterprise network location 720 and a wide area network.

Based on the above-described example flows of FIGS. 9A-9C and 10A-10D, A client device may be able to access a resource of a cloud-based service using either a connection to a gateway or a connection that bypasses the gateway. The example flows provided examples where a client device accesses one or more cloud-based services and, in particular, performs an application session for an application being executed by a resource of the cloud-based network environment. The example flows illustrated that gateway of a cloud-based network environment may be bypassed if the resource that executes an application and the client device share a network location. Further, the example flows illustrated that a gateway may still be used if the resource that executes an application and the client device do not share a network location.

Figure 11:
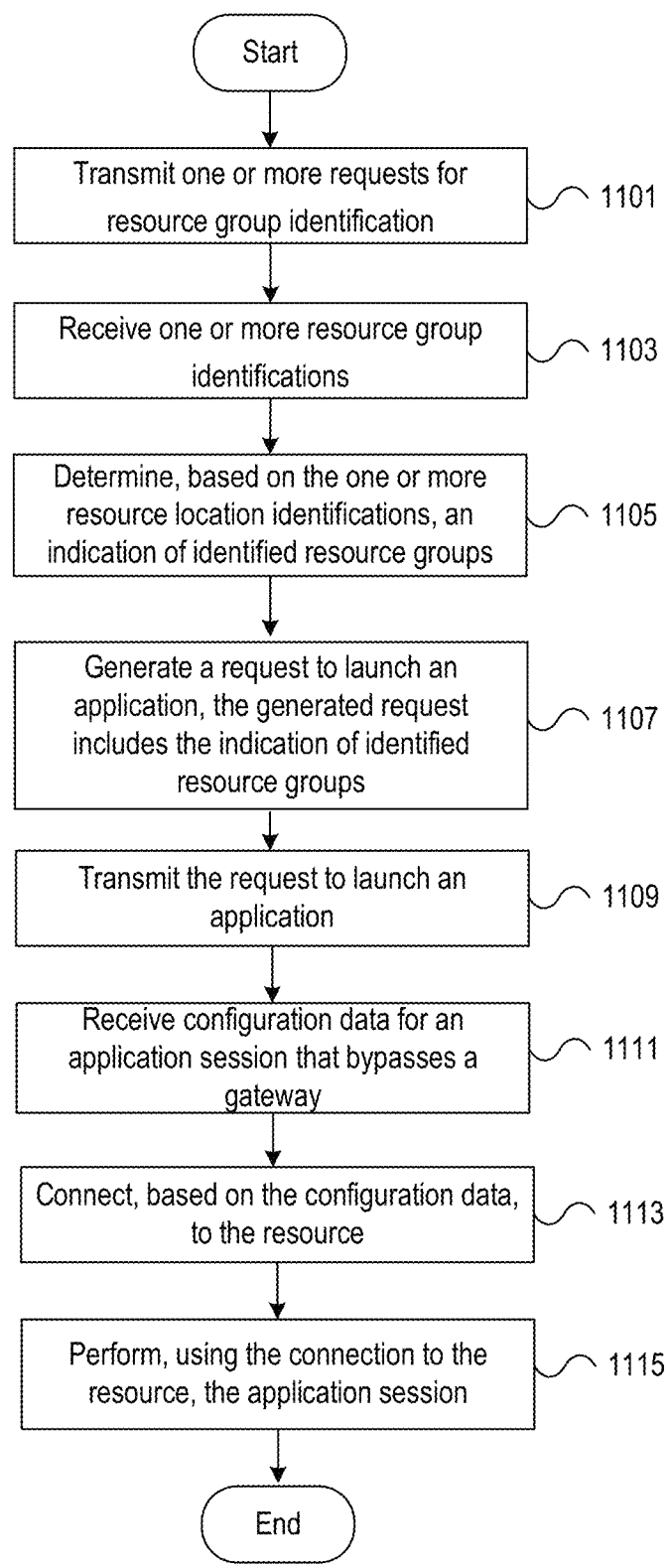
FIG. 11 illustrates an example method for a client device communicating with a resource by bypassing a gateway in a remote access or cloud-based network environment.

Another way to illustrate the way in which a gateway may be bypassed in a cloud-based network environment may be to discuss the various steps that a client device performs in connection with the example flows of FIGS. 9A-9C and 10A-10D. FIG. 11 illustrates an example method for a client device communicating with a resource by bypassing a gateway. Executing a method similar to FIG. 11 may allow the client device 728 to perform in accordance with the example flows of FIGS. 9A-9C and 10A-10D.

At step 1101, a client device may transmit one or more requests for resource group identification. This transmission may be intended to be received by each resource registered for cloud-based services. Additionally, this transmission may be performed by a multicast transmission and via the local network of the client device's network location (e.g., the first enterprise network location 720).

The client device may perform the transmission of the one or more requests for resource group identification based on receipt of resource information. The resource information may be received, for example, based on the client device initiating access to the cloud-based services, based on the client device transmitting a request for an account record, and based on the client device determining a network condition has changed. Examples of network conditions include a connection to a local network, a disconnection to a local network, a change in address information for a resource registered for cloud-based services, and a change in which resources are registered for cloud-based services.

At step 1103, the client device may, based on the one or more requests for resource group identification, receive, from one or more resources registered for cloud-based services, one or more resource group identifications. In general, a resource group identification will be received from a resource only if the resource received a request for resource identification. A resource may receive a request for resource identification if it is located at the same network location as the client device. Thus, the client device may receive one or more resource identifications from one or more resources that are located at the same network location as the client device.

At step 1105, the client device may determine, based on the one or more resource group identifications, an indication of identified resource groups. The indication of identified resource groups may indicate which resource groups the client device is able to communicate with if the gateway is bypassed. In other words, the indication of identified resource groups may indicate which resource groups the client device is able to communicate with using a local network of the client device's network location.

At step 1107, the client device may generate a request to launch an application. The application may be provided by the cloud-based services and may, once launched, be executed by one of the resources registered for the cloud-based services. The request to launch the application may include the indication of identified resource groups.

At step 1109, the client device may transmit the request to launch the application. This request may be transmitted to a computing platform of the cloud-based services. The network location of the computing platform may be different than the client device's network location. For example, the computing platform may be configured to provide, among other services, a gateway and, thus, the computing platform may be located at an external network location. The external network location may be different from the client device's network location. Indeed, the client device's network location and the external network location may be separated at least by a wide area network. Additionally, the computing platform may be configured to provide an application store and the request to launch the application may be transmitted to the application store.

At step 1111, the client device may receive, from the computing platform, configuration data for an application session that bypasses the gateway. The configuration data may be an ICA file. Additionally, the configuration data may have resulted if a resource selected to execute the application is also one of the resources indicated by the indication of identified resource groups. In other words, this configuration data may have resulted if the resource that is to execute the application and the client device are both located at the same network location.

At step 1113, the client device may connect, based on the configuration data, to the resource that is to execute the application. The connection may be an encrypted data connection, a VPN connection, or a microVPN connection. Additionally, the connection between the resource and the client device may use the local network of the client device's network location and not a wide area network that interfaces the client device's network location to other network locations, such as the external network location. In other words, data that is transmitted via the connection between the resource and the client device may only use the networking resources of the client device's network location and may not exit the client device's network location. In this manner, the client device may bypass the gateway.

At step 1115, the client device may perform, using the connection that bypasses the gateway, the application session. For example, if the application is a remote desktop application, the resource may transmit, via the connection that bypasses the gateway, an update to a user interface of the remote desktop application. Upon receiving the update, the client device 728 may regenerate a display to incorporate the update to the user interface of the remote desktop application. The update may, based on the connection between the resource and the client device, be transmitted using only network resources of the client device's network location, may not exit the client device's network location, and may bypass the gateway.

The examples discussed in connection with FIGS. 9A-9C, 10A-10C and 11 are only some of the many embodiments that may be realized based on the methods, block diagrams, and system architectures, etc., described throughout this disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   transmitting, by a computing device at a first network location, one or more first requests for one or more responses from resources that are located at the first network location;
   receiving, by the computing device from a first resource associated with a first resource group and based on at least one of the one or more first requests, a first resource group identification, wherein the first resource is at the first network location;
   determining, based on the first resource group identification, a first indication that the computing device is able to communicate with the first resource group if a gateway is bypassed, wherein the gateway is at a second network location;
   transmitting, by the computing device and to a computing platform associated with the gateway, a request to launch a first application, wherein the computing platform is at the second network location, and wherein the request to launch the first application includes the first indication that the computing device is able to communicate with the first resource group if the gateway is bypassed;
   based on the request to launch the first application, receiving, by the computing device and from the computing platform, first configuration data for a first application session, wherein the first configuration data indicates, based on the first indication that the computing device is able to communicate with the first resource group if the gateway is bypassed, a first connection, to the first resource, that bypasses the gateway and is to be used for the first application session;
   causing, by the computing device and based on the first configuration data, establishment of the first connection; and
   performing, by the computing device, the first application session using the first connection.

2. The method of claim 1, further comprising:
   transmitting, by the computing device and to the computing platform, a request to launch a second application, wherein the request to launch the second application includes the first indication that the computing device is able to communicate with the first resource group if the gateway is bypassed;
   based on the request to launch the second application, receiving, by the computing device and from the computing platform, second configuration data for a second application session, wherein the second configuration data indicates a second connection to the gateway;
   causing, by the computing device and based on the second configuration data, establishment of the second connection; and
   performing, by the computing device, the second application session using the second connection.

3. The method of claim 1, wherein the first resource group identification includes an identifier of the first resource group,
   wherein the first indication that the computing device is able to communicate with the first resource group if the gateway is bypassed includes the identifier of the first resource group, and
   wherein transmitting the one or more first requests is performed via one or more multicast transmissions.

4. The method of claim 1, further comprising:
   transmitting, by the computing device and based on determining that a network condition has changed, one or more second requests;
   receiving, by the computing device from a second resource associated with a second resource group and as a response to at least one of the one or more second requests, a second resource identification; and
   determining, based on the second resource identification, a second indication that the computing device is able to communicate with the second resource group if the gateway is bypassed.

5. The method of claim 4, wherein the network condition is based on the computing device moving to a third network location, and
   wherein the second resource is located at the third network location.

6. The method of claim 1, wherein the first configuration data comprises an Independent Computing Architecture (ICA) file,
   wherein the first resource comprises a connector and a host,
   wherein the first resource group identification is received from the connector, and
   wherein the first connection is to the host.

7. The method of claim 1, wherein the first network location and the second network location are separated by a wide area network, and
   wherein the first connection, when established, is configured to transmit data without using the wide area network.

8. The method of claim 1, wherein the first connection, when established, is configured to transmit data without the data exiting the first network location; and
    wherein receiving the first resource group identification is performed based on the first resource being able to receive and respond to the at least one of the one or more first requests by the computing device and the first resource both being located at the first network location.

9. The method of claim 1, wherein the first configuration data indicates, based on one or more capabilities of the first resource, a type of encryption to use for data that is to be transmitted via the first connection.

10. The method of claim 1, wherein the first configuration data indicates, based on one or more capabilities of the first resource, that the first connection is a type of virtual private network (VPN) connection for the first application session.

11. An apparatus comprising:
    one or more processors; and
    memory storing executable instructions that, when executed by the one or more processors, cause the apparatus to:
        transmit, based on the apparatus being located at a first network location, one or more first requests for one or more responses from resources that are located at the first network location;
        receive, from a first resource associated with a first resource group and based on at least one of the one or more first requests, a first resource group identification, wherein the first resource is at the first network location;
        determine, based on the first resource group identification, a first indication that the apparatus is able to communicate with the first resource group if a gateway is bypassed, wherein the gateway is at a second network location;
        transmit, to a computing platform associated with the gateway, a request to launch a first application, wherein the computing platform is at the second network location, and wherein the request to launch the first application includes the first indication that the apparatus is able to communicate with the first resource group if the gateway is bypassed;
        based on the request to launch the first application, receive, from the computing platform, first configuration data for a first application session, wherein the first configuration data indicates, based on the first indication that the computing device is able to communicate with the first resource group if the gateway is bypassed, a first connection, to the first resource, that bypasses the gateway and is to be used for the first application session;
        cause, based on the first configuration data, establishment of the first connection; and
        perform the first application session using the first connection.

12. The apparatus of claim 11, wherein the executable instructions, when executed by the one or more processors, cause the apparatus to:
    transmit, to the computing platform, a request to launch a second application, wherein the request to launch the second application includes the first indication that the apparatus is able to communicate with the first resource group if the gateway is bypassed;
    based on the request to launch the second application, receive, from the computing platform, second configuration data for a second application session, wherein the second configuration data indicates a second connection to the gateway;
    cause, based on the second configuration data, establishment of the second connection; and
    perform the second application session using the second connection.

13. The apparatus of claim 11, wherein the first resource group identification includes an identifier of the first resource group,
    wherein the first indication that the apparatus is able to communicate with the first resource group if the gateway is bypassed includes the identifier of the first resource group, and
    wherein the executable instructions, when executed by the one or more processors, cause the apparatus to transmit the one or more first requests via one or more multicast transmissions.

14. The apparatus of claim 11, wherein the executable instructions, when executed by the one or more processors, cause the apparatus to:
    transmit, based on determining that a network condition has changed, one or more second requests;
    receive, from a second resource associated with a second resource group and as a response to at least one of the one or more second requests, a second resource group identification; and
    determine, based on the second resource group identification, a second indication that the apparatus is able to communicate with the second resource group if the gateway is bypassed.

15. The apparatus of claim 11, wherein the first network location and the second network location are separated by a wide area network, and
    wherein the first connection, when established, is configured to transmit data without using the wide area network.

16. One or more non-transitory computer-readable media storing executable instructions that, when executed, cause an apparatus to:
    transmit, based on the apparatus being located at a first network location, one or more first requests for one or more responses from resources that are located at the first network location;
    receive, from a first resource associated with a first resource group and as a response to based on at least one of the one or more first requests, a first resource group identification, wherein the first resource is at the first network location;
    determine, based on the first resource group identification, a first indication that the apparatus is able to communicate with the first resource group if a gateway is bypassed, wherein the gateway is at a second network location;
    transmit, to a computing platform associated with the gateway, a request to launch a first application, wherein the computing platform is at the second network location, and wherein the request to launch the first application includes the first indication that the apparatus is able to communicate with the first resource group if the gateway is bypassed;
    based on the request to launch the first application, receive, from the computing platform, first configuration data for a first application session, wherein the first configuration data indicates, based on the first indication that the computing device is able to communicate with the first resource group if the gateway is bypassed, a first connection, to the first resource, that bypasses the gateway and is to be used for the first application session;

cause, based on the first configuration data, establishment of the first connection; and perform the first application session using the first connection.

17. The one or more non-transitory computer-readable media of claim 16, wherein the executable instructions, when executed, cause the apparatus to:

transmit, to the computing platform, a request to launch a second application, wherein the request to launch the second application includes the first indication that the apparatus is able to communicate with the first resource group if the gateway is bypassed;

based on the request to launch the second application, receive, from the computing platform, second configuration data for a second application session, wherein the second configuration data indicates a second connection to the gateway;

cause, based on the second configuration data, establishment of the second connection; and perform the second application session using the second connection.

18. The one or more non-transitory computer-readable media of claim 16, wherein the first resource group identification includes an identifier of the first resource group, wherein the first indication that the apparatus is able to communicate with the first resource group if the gateway is bypassed includes the identifier of the first resource group, and wherein the executable instructions, when executed, cause the apparatus to transmit the one or more first requests via one or more multicast transmissions.

19. The one or more non-transitory computer-readable media of claim 16, wherein the executable instructions, when executed, cause the apparatus to:

transmit, based on determining that a network condition has changed, one or more second requests;

receive, from a second resource and as a response to at least one of the one or more second requests, a second resource group identification; and determine, based on the second resource group identification, a second indication that the apparatus is able to communicate with the second resource group if the gateway is bypassed.

20. The one or more non-transitory computer-readable media of claim 16, wherein the first configuration data comprises an Independent Computing Architecture (ICA) file, wherein the first resource comprises a connector and a host, wherein the first resource group identification is received from the connector, and wherein the first connection is to the host.

* * * * *